(12) United States Patent
Li et al.

(10) Patent No.: US 11,135,513 B2
(45) Date of Patent: Oct. 5, 2021

(54) VIRTUAL VEHICLE CONTROL METHOD, MODEL TRAINING METHOD, CONTROL DEVICE AND STORAGE MEDIUM

(71) Applicant: Tencent Technology (Shenzhen) Company Limited, Shenzhen (CN)

(72) Inventors: Deyuan Li, Shenzhen (CN); Yuanchun Li, Shenzhen (CN); Runzhi Jiang, Shenzhen (CN); Liuyou Huang, Shenzhen (CN); Peng Wang, Shenzhen (CN); Xuefeng Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/942,321

(22) Filed: Jul. 29, 2020

(65) Prior Publication Data
US 2020/0353356 A1 Nov. 12, 2020

Related U.S. Application Data

(63) Continuation of application No. PCT/CN2019/081168, filed on Apr. 3, 2019.

(30) Foreign Application Priority Data

May 18, 2018 (CN) .......................... 201810482238.0

(51) Int. Cl.
*A63F 13/803* (2014.01)
*A63F 13/55* (2014.01)
*A63F 13/5378* (2014.01)

(52) U.S. Cl.
CPC .......... *A63F 13/55* (2014.09); *A63F 13/5378* (2014.09); *A63F 13/803* (2014.09)

(58) Field of Classification Search
CPC ........ A63F 13/803; A63F 13/67; A63F 13/55; A63F 13/5378; A63F 2300/8017; A63F 2300/6027
See application file for complete search history.

(56) References Cited

U.S. PATENT DOCUMENTS

2003/0109296 A1* 6/2003 Leach ..................... A63F 13/10
463/6
2008/0311983 A1 12/2008 Koempel et al.
(Continued)

FOREIGN PATENT DOCUMENTS

CN 103028243 A 4/2013
CN 107229973 A 10/2017
(Continued)

OTHER PUBLICATIONS

Tencent Technology, WO, PCT/CN2019/081168, Jun. 28, 2019, 4 pgs.
(Continued)

*Primary Examiner* — James S. McClellan
(74) *Attorney, Agent, or Firm* — Morgan, Lewis & Bockius LLP

(57) ABSTRACT

A method for controlling a virtual vehicle in a racing game application includes: obtaining a virtual vehicle traveling picture including a picture of a virtual vehicle traveling on a virtual track of the racing game application; extracting a virtual track image from the virtual vehicle traveling picture, which is an image of a virtual track segment in which the virtual vehicle is located in real time; inputting the virtual track image into a traveling decision-making model, which was generated according to a sample track image and a sample traveling policy, the sample track image and the sample traveling policy being extracted from a sample vehicle traveling picture including a picture of another virtual vehicle controlled by an actual player traveling on the
(Continued)

virtual track; and controlling the virtual vehicle to travel on the virtual track according to a target traveling policy outputted by the traveling decision-making model.

20 Claims, 15 Drawing Sheets

(56) References Cited

U.S. PATENT DOCUMENTS

| | | | | |
|---|---|---|---|---|
| 2009/0051690 A1* | 2/2009 | Tipping | ............ | A63F 13/10 345/473 |
| 2011/0066369 A1* | 3/2011 | Klassen | ............ | G01C 21/00 701/465 |
| 2014/0274242 A1* | 9/2014 | Haswell | ............ | A63F 13/573 463/7 |

FOREIGN PATENT DOCUMENTS

| | | |
|---|---|---|
| CN | 107316457 A | 11/2017 |
| CN | 107564363 A | 1/2018 |
| CN | 108635861 A | 10/2018 |

OTHER PUBLICATIONS

Tencent Technology, IPRP, PCT/CN2019/081168, Nov. 24, 2020, 5 pgs.
Tencent Technology, ISR, PCT/CN2019/081168, Jun. 28, 2019, 3 pgs.
Chaudhari Raj et al., "Autonomous Driving Car Using Convolutional Neural Networks", 2018 Second International Conference on Inventive Communication and Computational Technologies (ICICCT), IEEE, Apr. 20, 2018, pp. 936-940, XP033408975, DOI: 10.1109/ICICCT.2018.8473043.
Extended European Search Report, EP19803364.9, dated May 11, 2021, 13 pgs.
Guohao Li et al., "Teaching UAVS to Race with Observational Imitation Learning", arXiv.org, Cornell University Library, Mar. 3, 2018 XP080857471, 10 pgs.
Jason Brownlee, "Why One-Hot Encode Data in Machine Learning?", Machine Learning Mastery, Jul. 28, 2017, XP055800432, Retrieved from the Internet: https://machinelearningmastery.com/why-one-hot-encode-data-in-machine-learning/.
Oriol Vinyals et al., "Starcraft II: A New Challenge for Reinforcement Learning", arXiv.org, Cornell University Library, Aug. 16, 2017, XP080953121, 20 pgs.

* cited by examiner

VIRTUAL VEHICLE CONTROL METHOD, MODEL TRAINING METHOD, CONTROL DEVICE AND STORAGE MEDIUM

CROSS REFERENCE TO RELATED APPLICATIONS

This application is a continuation application of PCT Patent Application No. PCT/CN2019/081168, entitled "VIRTUAL VEHICLE CONTROL METHOD, MODEL TRAINING METHOD. CONTROL DEVICE AND STORAGE MEDIUM", filed on Apr. 3, 2019, which claims priority to Chinese Patent Application No. 201810482238.0, filed with the Chinese Patent Office on May 18, 2018, and entitled "METHOD FOR CONTROLLING VEHICLE IN APPLICATION, DEVICE, AND STORAGE MEDIUM", all of which are incorporated herein by reference in their entirety.

FIELD OF THE TECHNOLOGY

Embodiments of this application relate to the field of artificial intelligence (AI), and in particular, to a virtual vehicle control method, a model training method, a control device, and a storage medium.

BACKGROUND OF THE DISCLOSURE

In an application development stage, a developer usually tests an application in an automatic test manner. For example, for a racing game application, the developer uses a virtual vehicle to simulate a scenario in which an actual player controls a vehicle to run, so as to test a vehicle running game application.

To make the virtual vehicle achieve a more real simulation effect, in a virtual vehicle control method, the developer presets traveling logic of the virtual vehicle through a finite state machine (FSM) or a behavior tree (BT). In an automatic test process, a current state of the virtual vehicle is inputted into the FSM or the BT, and the virtual vehicle is controlled to travel according to a traveling parameter outputted by the FSM or the BT.

However, in the foregoing implementation, the traveling logic of the virtual vehicle needs to be formulated manually by the developer. This may lead to a long development time and high development costs of the virtual vehicle. In addition, the manually formulated traveling logic is inflexible, resulting in a poor actual simulation effect of the virtual vehicle.

SUMMARY

According to a first aspect of the present application, a method for controlling a virtual vehicle in a racing game application is performed by a computing device, the method comprising:

obtaining a virtual vehicle traveling picture, the virtual vehicle traveling picture including a picture of a virtual vehicle traveling on a virtual track of the racing game application;

extracting a virtual track image from the virtual vehicle traveling picture, the virtual track image being an image of a virtual track segment in which the virtual vehicle is located in real time;

inputting the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture including a picture of another virtual vehicle controlled by an actual player traveling on the virtual track of the racing game application; and controlling the virtual vehicle to travel on the virtual track of the racing game application according to a target traveling policy outputted by the traveling decision-making model based on the virtual track image.

According to a second aspect of the present application, a computing device includes a memory and one or more processors, the memory storing computer-readable instructions, the computer-readable instructions, when executed by the one or more processors, causing the computing device to perform the aforementioned method for controlling a virtual vehicle in a racing game application.

According to a third aspect of the present application, a non-transitory computer-readable storage medium storing a plurality of computer-readable instructions, the computer-readable instructions, when being executed by one or more processors of a computing device, causing the computing device to perform the aforementioned method for controlling a virtual vehicle in a racing game application.

BRIEF DESCRIPTION OF THE DRAWINGS

The following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

A virtual vehicle control method provided in the embodiments of this application may be used in an automated test scenario of a racing game application, or a scenario of analyzing an operating habit of a player in a racing game application. Certainly, the method may alternatively be applicable to other application scenarios in which a vehicle controlling habit of a player needs to be analyzed/learned. This is not limited in the embodiments of this application.

Automated Test Scenario of a Racing Game Application

The virtual vehicle control method provided in the embodiments of this application may be set in a server or a personal computer in the form of automated test software (or with a dedicated AI chip). Using the personal computer as an example, when the racing game application needs to be tested, the personal computer is connected to a to-be-tested device installed with the racing game application, and the personal computer sends a control instruction to the to-be-tested device according to an application picture displayed by the to-be-tested device, so that the to-be-tested device controls, according to the control instruction, a virtual vehicle in the racing game application to travel.

Scenario of Analyzing an Operating Habit of a Player in a Racing Game Application A developer usually analyzes an operating habit of a player regularly, thereby designing a new track or adjusting an existing track according to the operating habit of the player. The virtual vehicle control method provided in the embodiments of this application may be set in a server in the form of software (or with a dedicated AI chip). Based on a virtual vehicle running video uploaded by a terminal (obtained by recording an application picture of a virtual vehicle running application), the server obtains a corresponding behavior decision-making model through training according to a machine learning algorithm. By analyzing output characteristics of the traveling decision-making model, the developer can determine operating habits of different player groups (for example, different game levels).

Scenario of Automated Driving in a Racing Game Application

After the trained traveling decision-making model is obtained, a virtual vehicle may be automatically controlled in the racing game application through the traveling decision-making model, and automated driving of the virtual vehicle may be implemented without direction operations of a user.

Figure 1:
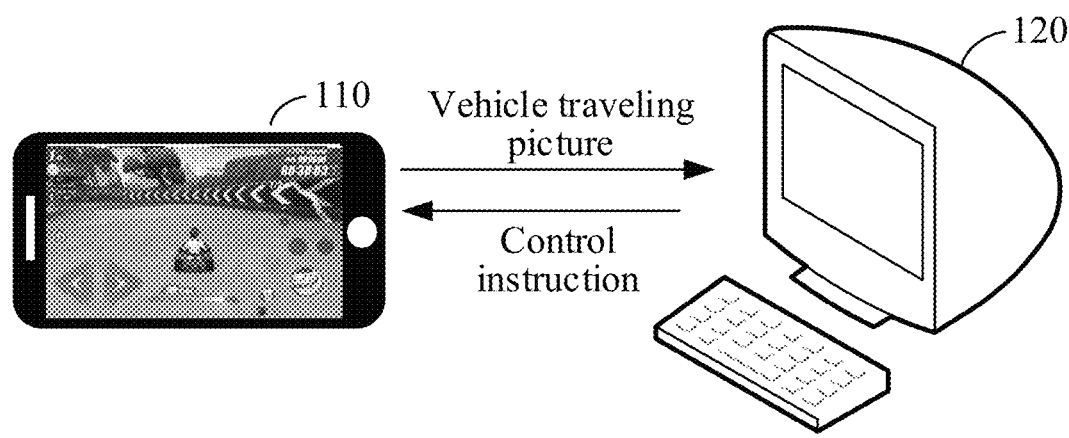
FIG. 1 is a schematic diagram of an implementation environment according to an embodiment of this application.

FIG. 1 is a schematic diagram of an implementation environment according to an embodiment of this application. The implementation environment includes a terminal 110 and a control device 120.

The terminal 110 is an electronic device installed with a racing game application, and the electronic device may be a smartphone, a tablet computer, or the like. The racing game application refers to a game application including a virtual vehicle running scenario, the virtual vehicle running scenario refers to a scenario including at least two virtual vehicles running on the same virtual track, and the virtual vehicle may be a virtual car, a virtual motorbike, a virtual tank, a virtual bicycle, or the like. A representation form of the virtual vehicle in the racing game application is not limited in this embodiment of this application.

The terminal 110 is connected to the control device 120 in a wired or wireless manner. Optionally, to ensure the rate and stability of data transmission, the terminal 110 is connected to the control device 120 by using a data line.

The control device 120 is a device installed with automated test software, and the control device 120 may be a personal computer or a server. In FIG. 1, the control device 120 being a personal computer is used as an example. Optionally, the control device 120 in this embodiment of this application has functions of model training and virtual vehicle control.

In a possible implementation, in a model training stage, the terminal 110 records at least one vehicle running video, the vehicle running video including a vehicle traveling picture when an actual player controls a vehicle to travel on a track, and sends the vehicle running video to the control device 120. The control device 120 generates, according to the vehicle traveling picture in the vehicle running video, a traveling policy model through training by using a machine learning algorithm. In a virtual vehicle control stage, the terminal 110 transmits a real-time picture of the racing game application to the control device 120. The control device 120 determines a target traveling policy of a virtual vehicle in the picture according to the real-time picture and the traveling policy model, and sends a corresponding control instruction to the terminal 110, so that the terminal 110 simulates, according to the control instruction, an effect of the actual player controlling the virtual vehicle.

In other possible implementations, when the terminal 110 installed with the racing game application is equipped with an AI chip with high processing performance, the functions of model training and virtual vehicle control may also be independently implemented by the terminal 110 with the AI chip without the assistance of the control device 120. This is not limited in this embodiment of this application.

For ease of description, the following embodiments are described through an example in which a virtual vehicle control method is performed by a control device.

Figure 2:
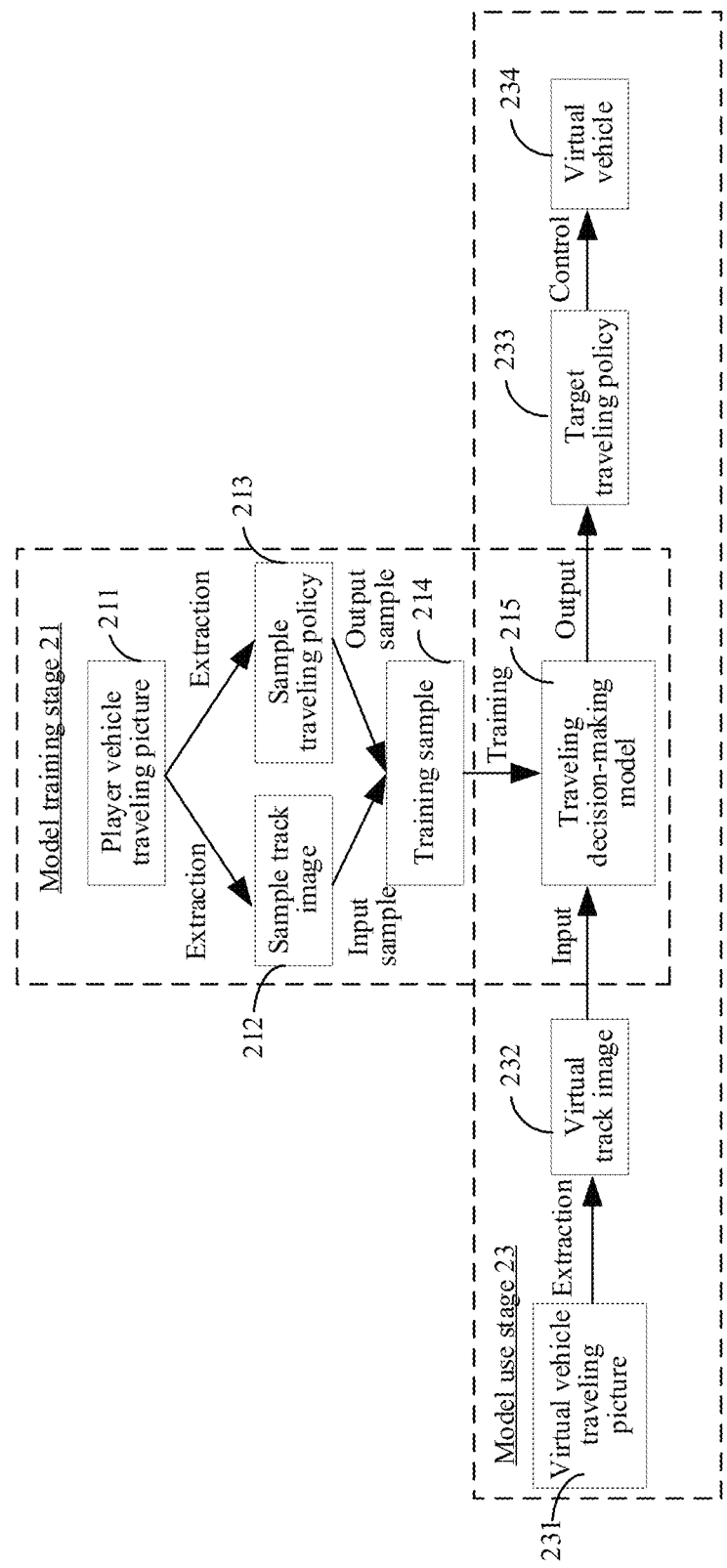
FIG. 2 is a schematic principle diagram of a virtual vehicle control method according to an embodiment.

As shown in FIG. 2, the virtual vehicle control method provided in this embodiment of this application may be divided into a model training stage 21 and a model use stage 23. In the model training stage 21, the control device extracts, from a player vehicle traveling picture 211 of a player video, a sample track image 212 and a sample traveling policy 213 of a virtual vehicle in the picture, uses the sample track image 212 as an input sample in training samples and the sample traveling policy 213 as an output sample in the training samples, and obtains, according to a plurality of groups of training samples 214, a traveling decision-making model 215 through training by using a machine learning algorithm. In the model use stage 23, after obtaining a real-time virtual vehicle traveling picture 231, the control device extracts a virtual track image 232 of a virtual track segment in which the virtual vehicle is located from the virtual vehicle traveling picture 231, and inputs the virtual track image 232 into the traveling decision-making model 215. The traveling decision-making model 215 outputs a corresponding target traveling policy 233 according to the inputted virtual track image 232, so that the control device simulates, according to the target traveling policy 233, that a real user controls a virtual vehicle 234 to travel.

The following describes model training and model use processes by using different embodiments.

Figure 3:
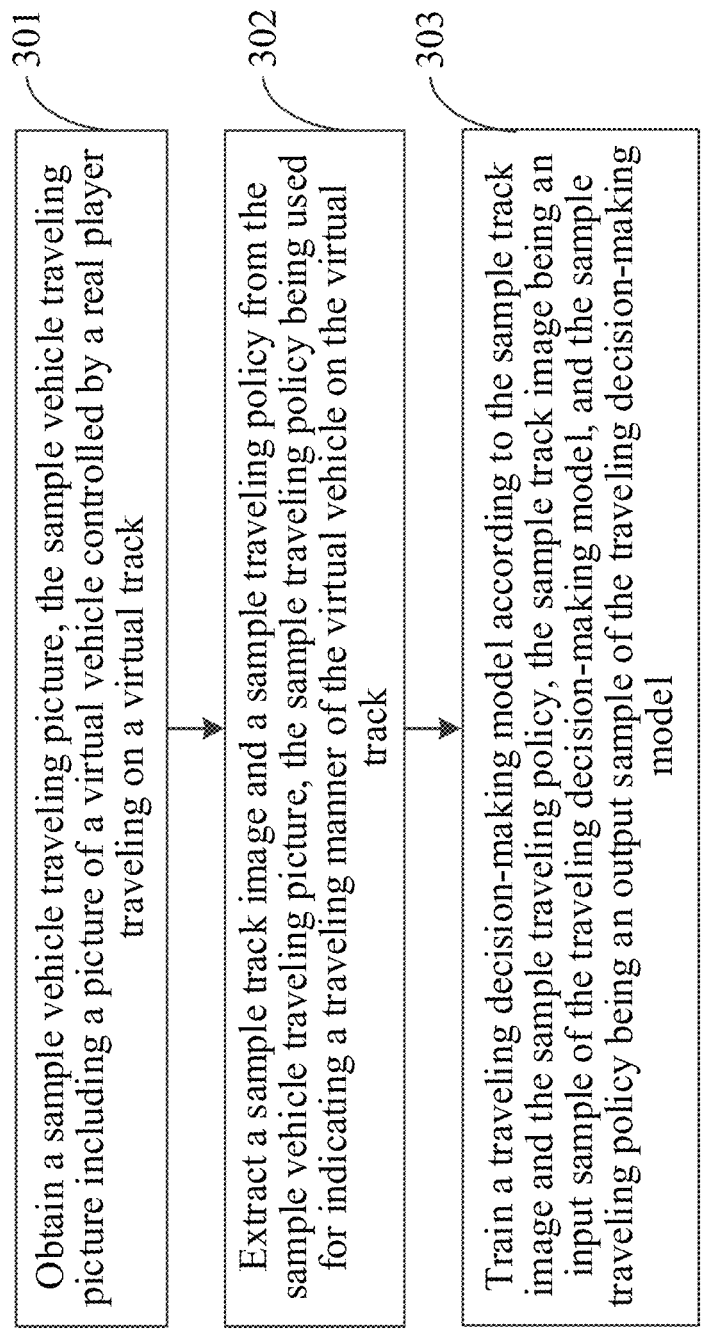
FIG. 3 is a flowchart of a model training method according to an embodiment of this application.

FIG. 3 is a flowchart of a model training method according to an embodiment of this application. The method is used in the control device 120 in the implementation environment shown in FIG. 1. The method includes the following steps.

Step 301. Obtain a sample vehicle traveling picture, the sample vehicle traveling picture including a picture of a virtual vehicle controlled by an actual player traveling on a virtual track.

Optionally, the sample vehicle traveling picture is a video frame of a sample vehicle running video, and the sample vehicle running video is a video recorded by a terminal through a screen recording function when an actual player controls a virtual vehicle in an application to travel.

Optionally, in addition to the picture of the virtual vehicle traveling on the virtual track, the sample vehicle traveling picture may further include at least one operation control. The operation control is configured to control the virtual vehicle to travel, and different operation controls are configured to trigger the virtual vehicle to travel in different manners.

Figure 4:
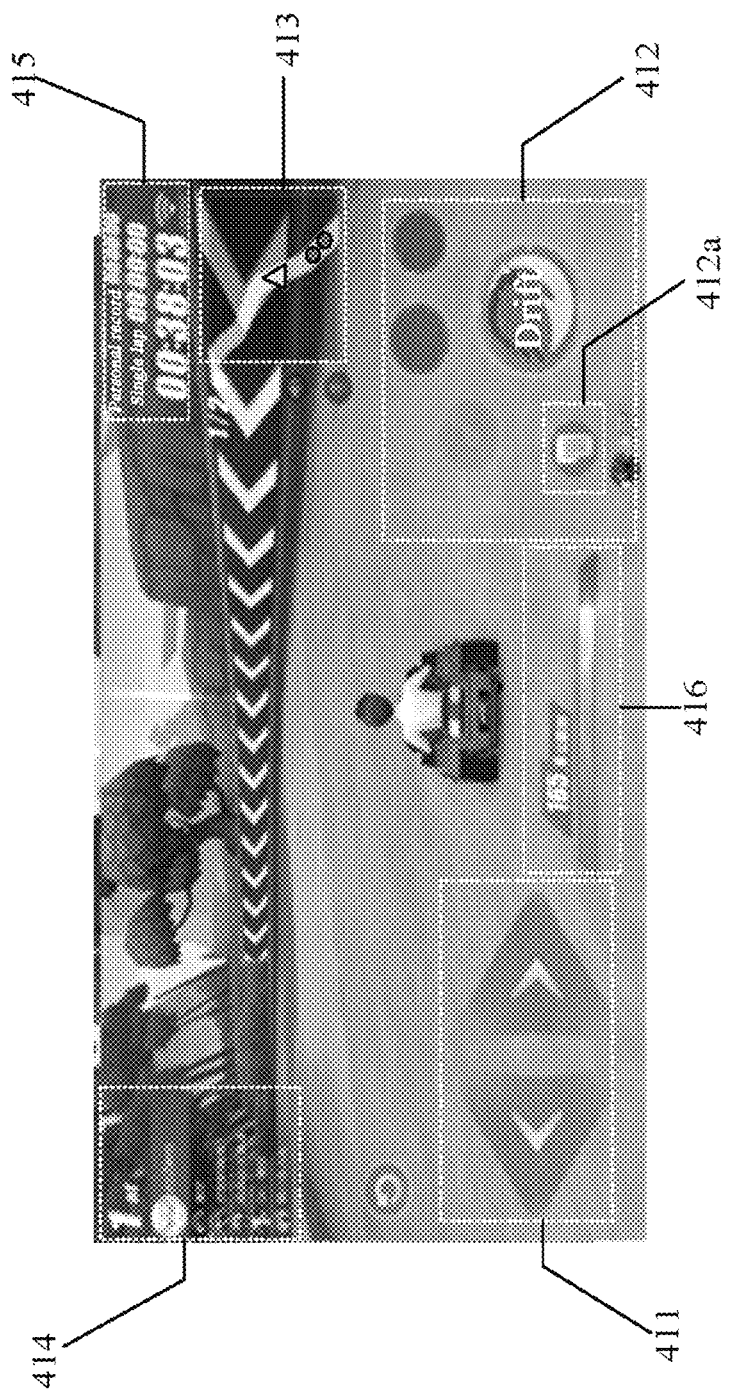
FIG. 4 is a schematic diagram of a sample vehicle traveling picture according to an embodiment.

For example, as shown in FIG. 4, the sample vehicle traveling picture (the video frame) includes a first control area 411 located at the lower left corner and a second control area 412 located at the lower right corner. The first control area 411 includes a left-turning control and a right-turning control, and the second control area 412 includes a braking control, a drift control, and an item use control.

Optionally, the sample vehicle traveling picture further includes a map display area, the map display area is used for displaying an image of a virtual track segment in which the virtual vehicle is located in real time, and the image displayed in the map display area changes as the virtual vehicle travels. The image of the virtual track segment is displayed in the map display area, and in addition, identifiers with different shapes or colors may be further used for identifying locations of the current virtual vehicle and other virtual vehicles for virtual vehicle running on the virtual track segment.

For example, as shown in FIG. 4, the sample vehicle traveling picture includes a map display area 413, and in the map display area, an arrow is used for marking a location of a current virtual vehicle on a virtual track segment, and dots are used for marking locations of other virtual vehicles on the virtual track segment.

Optionally, the sample vehicle traveling picture may further include a vehicle running information display area, and the vehicle running information display area is used for displaying information such as a current speed, a current ranking, a vehicle running time, and a lap number of the virtual vehicle during the running of the vehicle.

For example, as shown in FIG. 4, the sample vehicle traveling picture includes a ranking display area 414 and a vehicle running time display area 415, a real-time ranking of the current virtual vehicle is displayed in the ranking display area 414, and information such as a lap time is displayed in the vehicle running time display area 415.

Step 302. Extract a sample track image and a sample traveling policy from the sample vehicle traveling picture, the sample traveling policy being used for indicating a traveling manner of the virtual vehicle on the virtual track.

The sample track image and the sample traveling policy extracted from the same sample vehicle traveling picture form a group of training samples.

The sample track image is used for indicating the virtual track segment in which the virtual vehicle is located in real time, and the sample track image is an entire image of the sample vehicle traveling picture, or a partial image in the sample vehicle traveling picture.

In a possible implementation, to prevent a complex sample vehicle traveling picture from interfering with subsequent model training, when the sample vehicle traveling picture only includes simple elements, the control device determines the entire sample vehicle traveling picture as a sample track image, and when the sample vehicle traveling picture includes complex elements, the control device extracts an image of a specified area in the sample vehicle traveling picture as a sample track image.

The sample traveling policy is used for indicating a traveling manner used by the virtual vehicle on a current virtual track segment. Optionally, the control device determines a trigger status of each operation control in the sample vehicle traveling picture through image recognition, and determines a traveling manner used by the virtual vehicle, so as to generate a corresponding sample traveling policy.

Step 303. Train a traveling decision-making model according to the sample track image and the sample traveling policy, the sample track image being an input sample of the traveling decision-making model, and the sample traveling policy being an output sample of the traveling decision-making model.

Optionally, the traveling decision-making model is used for outputting a target traveling policy according to an inputted virtual track image, the virtual track image is extracted from a virtual vehicle traveling picture, and the target traveling policy is used for controlling the virtual vehicle to travel.

For different sample vehicle traveling pictures, the control device extracts a plurality of groups of training samples through steps 301 and 302, and trains the traveling decision-making model by using the sample track images as the input samples and the sample traveling policies as the output samples. After being pre-processed, the sample track image is used as the input sample for model training, and the pre-processing includes at least graying and scaling down.

Optionally, in a modeling stage, an original traveling decision-making model is constructed based on a convolutional neural network (CNN) model, and subsequently the traveling decision-making model is trained by using the training sample. For a specific manner of training the traveling decision-making model according to the training samples, reference may be made to a mature CNN-related algorithm. Details are not described again in this embodiment of this application.

In conclusion, in this embodiment of this application, a sample track image and a sample traveling policy are extracted from a sample vehicle traveling picture when an actual player controls a virtual vehicle to travel on a track, and a traveling decision-making model is trained by using the sample track image and the sample traveling policy as training samples, so that a corresponding target traveling policy can be obtained subsequently by extracting a virtual track image from a virtual vehicle traveling picture and inputting the virtual track image into the traveling decision-making model, thereby controlling, according to the target traveling policy, the virtual vehicle to travel on the track. Because the traveling decision-making model is obtained through training based on a behavior of the actual player controlling the virtual vehicle, a traveling policy outputted by the traveling decision-making model better conforms to an operating habit of the actual player, thereby achieving a more real simulation effect. In addition, when the traveling decision-making model is trained, the used training samples are all extracted from the virtual track image, so that a developer does not manually set the training samples, thereby reducing a development time and development costs.

In addition, in the process of training the traveling decision-making model by using the model training method, the control device directly extracts a training sample from a sample vehicle traveling picture based on a computer vision (image recognition) technology, thereby reducing the difficulty of obtaining the training sample. In addition, because there is no need to obtain internal data of the application, code of the application is not invaded and running of the application is not affected, thereby improving running stability of the application.

When the sample vehicle traveling picture includes excessive elements, if the sample vehicle traveling picture is directly used as a sample track image (an input sample) for model training, excessive interference elements in the sample track image affect accuracy of the model training. Therefore, in a possible implementation, when the sample vehicle traveling picture is complex and includes a map display area, the control device extracts an image displayed in the map display area as the sample track image.

Moreover, the actual player controls a traveling manner of a vehicle by triggering an operation control in the sample vehicle traveling picture, and there is a difference between a display style when the operation control is not triggered and a display style when the operation control is triggered. Therefore, the control device recognizes a trigger status of the operation control in the sample vehicle traveling picture by using image recognition, so as to determine a corresponding sample traveling policy according to the trigger status. The following provides descriptions by using an embodiment as an example.

Figure 5:
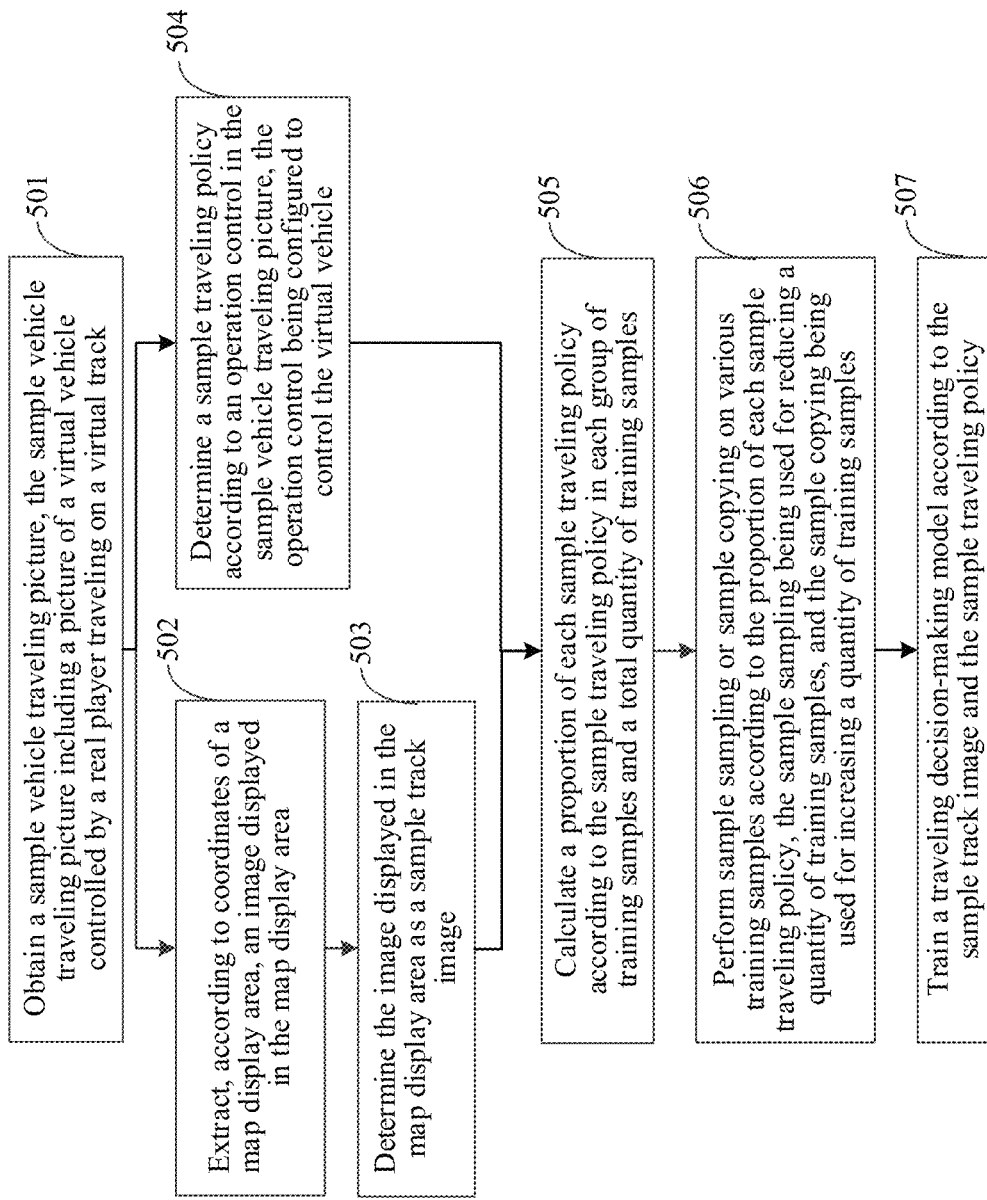
FIG. 5 is a flowchart of a model training method according to another embodiment of this application.

FIG. 5 is a flowchart of a model training method according to another embodiment of this application. The method is used in the control device 120 in the implementation environment shown in FIG. 1. The method includes the following steps.

Step 501. Obtain a sample vehicle traveling picture, the sample vehicle traveling picture including a picture of a virtual vehicle controlled by an actual player traveling on a virtual track.

Because training samples used for training a model are all extracted from the sample vehicle traveling picture, accuracy of a vehicle traveling manner (that is, quality of the training samples) in the sample vehicle traveling picture directly affects quality of the model and subsequent traveling quality of a virtual vehicle. Optionally, to improve model quality, the control device selects a sample vehicle running video in which a quantity of faults, a quantity of track collisions, the number of times of wrong-way driving, or a quantity of abnormal operations is less than a threshold, and extracts a video frame from the selected sample vehicle running video as the sample vehicle traveling picture.

Optionally, the control device may further screen the sample vehicle running video according to full speed in one lap or a ranking of a vehicle corresponding to a vehicle running video. This is not limited in this embodiment of this application.

In addition to a vehicle running picture, the vehicle running video recorded by a terminal may further include a non-vehicle running picture such as a ready picture and a loading picture before the vehicle running picture. Therefore, to avoid extracting a training sample from the non-vehicle running picture, optionally, the control device recognizes, through an image recognition technology, whether the video frame of the sample vehicle running video includes a specified operation control, and the specified operation control is a specific operation control in the vehicle running picture. For example, the specified operation control is at least one of a left-turning control, a right-turning control, a drift control, an acceleration control, and a braking control.

The specified control is recognized by using a corresponding image matching algorithm, for example, template matching, feature point matching, texture matching, and color matching. This is not limited in this embodiment of this application.

If a video frame includes the specified operation control, the control device retains the video frame. If a video frame does not include the specified operation control, the control device discards the video frame.

For example, as shown in FIG. 4, the control device recognizes, through template matching, that a video frame includes a braking control 412a, thereby determining that the video frame includes a vehicle running picture and retaining the video frame.

After obtaining the sample vehicle traveling picture, the control device further extracts a sample track image from the sample vehicle traveling picture through steps 502 and 503, and extracts a sample traveling policy through step 504. There is no strict sequence between steps 502 to 503 and step 504, that is, the control device may extract the sample track image and the sample traveling policy from the sample vehicle traveling picture at the same time. An execution sequence between steps 502 to 503 and step 504 is not limited in this embodiment of this application.

Step 502. Extract, according to coordinates of a map display area, an image displayed in the map display area.

In a possible implementation, the control device stores coordinates of a map display area in the vehicle running picture. When extracting the sample track image, the control device extracts, according to the coordinates, an image displayed in the map display area in the sample vehicle traveling picture.

For example, as shown in FIG. 4, the control device extracts an image displayed in a map display area 413.

In other possible implementations, the control device may further determine the coordinates of the map display area in the sample vehicle traveling picture through image recognition, so as to extract the image displayed in the map display area. This is not limited in this application.

Step 503. Determine the image displayed in the map display area as a sample track image.

In a possible implementation, when the image displayed in the map display area is non-transparent (transparency is 0), that is, when a background cannot be viewed through the map display area, the control device obtains the sample track image after performing gray processing and size scaling processing on the image displayed in the map display area.

In another possible implementation, as the map display area occupies a partial area of the vehicle running picture, to help a user view the background through the map display area, the image in the map display area is transparent (that is, translucent). If gray processing and size scaling processing are directly performed on the image displayed in the map display area, a background image causes interference and affects subsequent model training.

To reduce interference caused by the background image, in a possible implementation, the control device determines the sample track image by using the following steps.

Step 1. Perform feature extraction on the image displayed in the map display area, to obtain a sample track image and a sample vehicle image, a feature extraction manner including edge feature extraction and/or color feature extraction.

Because the track image, the vehicle image, and the background image have respective features, the control device may perform feature extraction on the image displayed in the map display area, so as to extract the sample track image and the sample vehicle image.

Optionally, the control device may obtain the sample track image and the sample vehicle image through the edge feature extraction and/or the color feature extraction. A Canny edge detection algorithm or a Sobel edge detection algorithm may be used when the edge feature extraction is performed. This is not limited in this embodiment.

Figure 6:
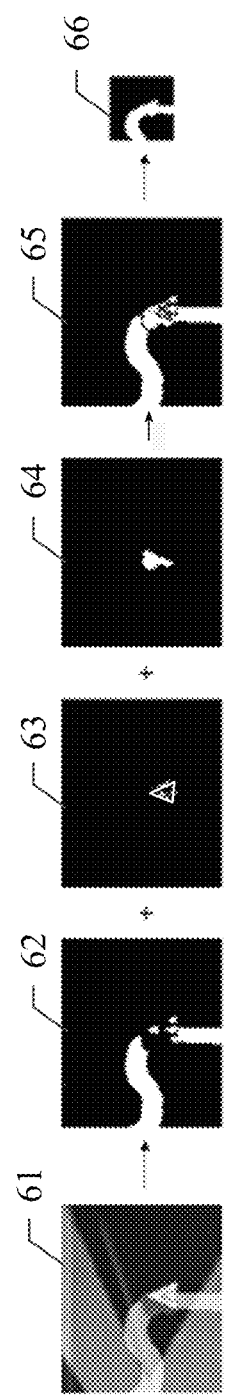
FIG. 6 is a schematic diagram of an implementation of determining a sample track image according to an image in a map display area.

For example, as shown in FIG. 6, a track is generally a continuous and smooth curve line (or a straight line), and the track is generally displayed in white in a map display area. Therefore, the control device performs edge feature extraction and color feature extraction on an image 61 in the map display area, and determines a white, continuous, and smooth curve line as a track, so as to obtain a sample track image 62.

For another example, because a virtual vehicle on the track is generally identified by using a yellow triangle (a current virtual vehicle) or a red dot (another virtual vehicle), the control device performs edge feature extraction and color feature extraction on the image 61 in the map display area, determines the yellow triangle as the current virtual vehicle to obtain a first sample vehicle image 63, and determines the red dot as the another virtual vehicle to obtain a second sample vehicle image 64.

Step 2. Synthesize the sample track image according to the sample track image and the sample vehicle image that are extracted.

After extracting the sample track image and the sample vehicle image, the control device synthesizes the sample track image and the sample vehicle image to generate the sample track image, and the size of the sample track image is the same as that of the image displayed in the map display area.

For example, as shown in FIG. 6, the control device synthesizes the sample track image 62, the first sample vehicle image 63, and the second sample vehicle image 64 to obtain a sample track image 65. Compared with the original image 61, the sample track image 65 reserves only the track image and the vehicle image and does not include the background image, thereby reducing interference caused by the background image.

Step 3. Scale the sample track image to a pre-determined size, the pre-determined size being an input image size specified by a traveling decision-making model.

Because the size of the input image of the traveling decision-making model finally obtained through training is fixed, when the size of the sample track image does not match the pre-determined size, the control device performs scaling on the sample track image according to the pre-determined size. For example, the pre-determined size is 50px*50px.

For example, as shown in FIG. 6, the control device scales the sample track image 65 to be a sample track image 66 with the pre-determined size.

Before scaling the sample track image, the control device further needs to perform gray processing on the sample track image.

Step 504. Determine a sample traveling policy according to an operation control in the sample vehicle traveling picture, the operation control being configured to control the virtual vehicle.

Figure 7:
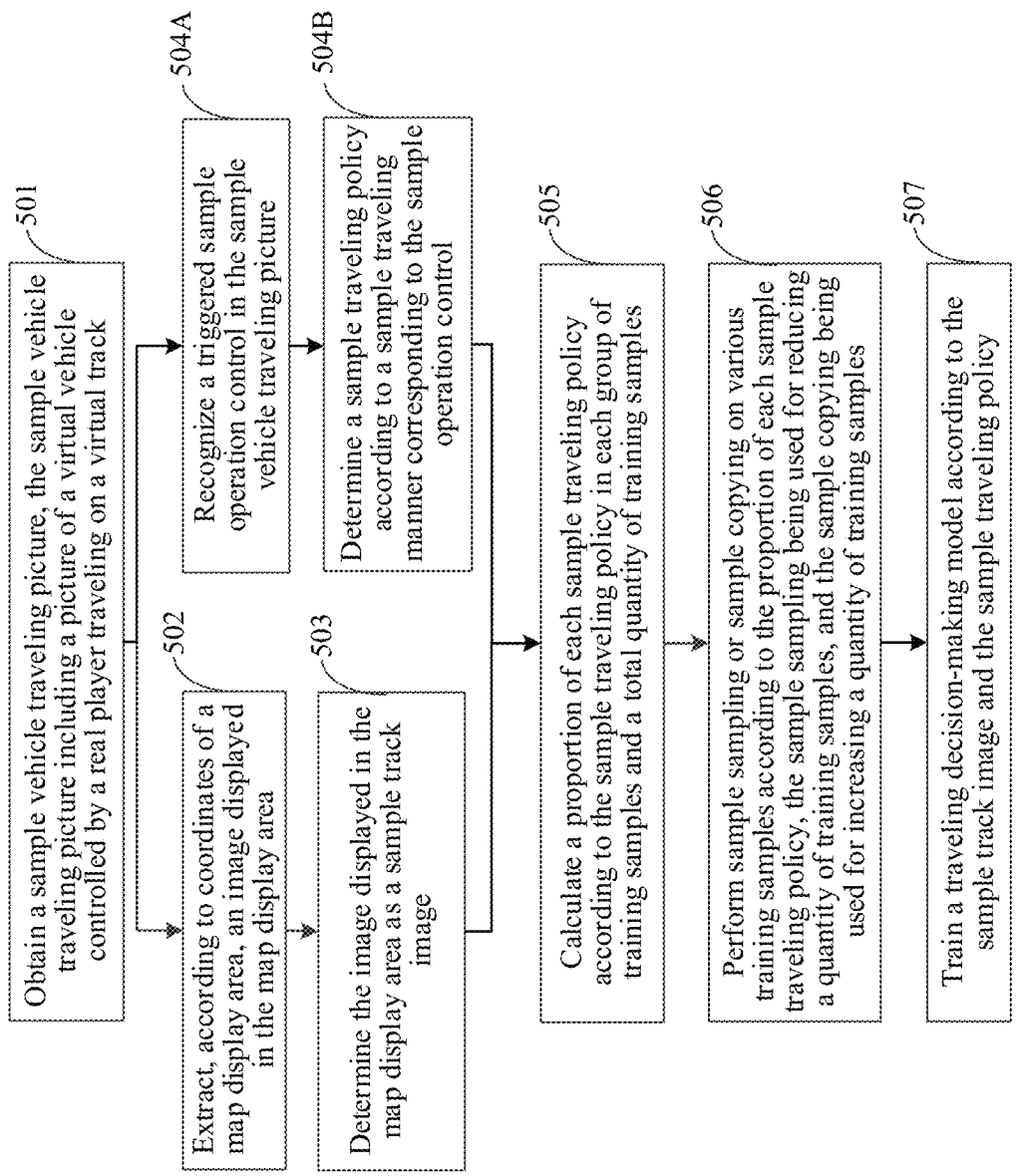
FIG. 7 is a flowchart of a model training method according to still another embodiment of this application.

In different virtual track segments, a player controls a vehicle to travel by triggering different operation controls. Therefore, the control device may determine a traveling policy used by a virtual vehicle according to a trigger status of the operation control in the sample vehicle traveling picture. In a possible implementation, the control device determines trigger statuses of the operation controls through image recognition. As shown in FIG. 7, this step includes the following steps.

Step 504A. Recognize a triggered sample operation control in the sample vehicle traveling picture.

In a possible implementation, when a player triggers an operation control in a vehicle running picture, the size of the triggered operation changes to remind the player that the control is triggered. Therefore, the control device may determine the triggered sample operation control according to the size of the operation control in the sample vehicle traveling picture. Optionally, this step includes the following steps.

Step 1. Obtain a trigger size of each operation control, the trigger size being a size displayed when an operation control is triggered.

Optionally, the control device stores the trigger size of each operation control in a triggered state, and the trigger size is large than the size of the operation control not triggered. When recognizing the triggered sample operation control, the control device obtains the trigger size.

For example, a correspondence between each operation control and the trigger size is shown in table 1.

TABLE 1

| Operation control | Trigger size | Original size |
|---|---|---|
| Left-turning control/right-turning control | 100 px * 100 px | 90 px * 90 px |
| Acceleration control | 80 px * 80 px | 70 px * 70 px |
| Braking control | 40 px * 40 px | 30 px * 30 px |
| Drift control | 60 px * 60 px | 50 px * 50 px |

Step 2. Determine an operation control of which a size matches the trigger size in the sample vehicle traveling picture as the triggered sample operation control.

Further, the control device obtains a real-time size of each operation control in the sample vehicle traveling picture, and compares whether the real-time size is consistent with the corresponding trigger size. If the real-time size is consistent with the trigger size, it is determined that the operation control is the triggered sample operation control. If the real-time size is inconsistent with the trigger size, it is determined that the operation control is not triggered.

In other possible implementations, the triggered operation control may have a display effect such as highlight. Correspondingly, the control device may pre-store a first form template of each operation control in an untriggered state and a second form template of each operation control in a triggered state, and calculate a matching degree between each operation control and the form template in the sample vehicle traveling picture through template matching, feature point matching, and texture matching. If the matching degree between the operation control and the first form template is higher than the matching degree between the operation control and the second form template, it is determined that the operation control is not triggered. If the matching degree between the operation control and the second form template is higher than the matching degree between the operation control and the first form template, it is determined that the operation control is triggered.

Optionally, during template matching, to avoid interference caused by a background image at an operation control displayed translucently, before performing the template matching, the control device may perform edge feature extraction on the operation control, and then perform the template matching, thereby improving accuracy of template matching.

Figure 8:
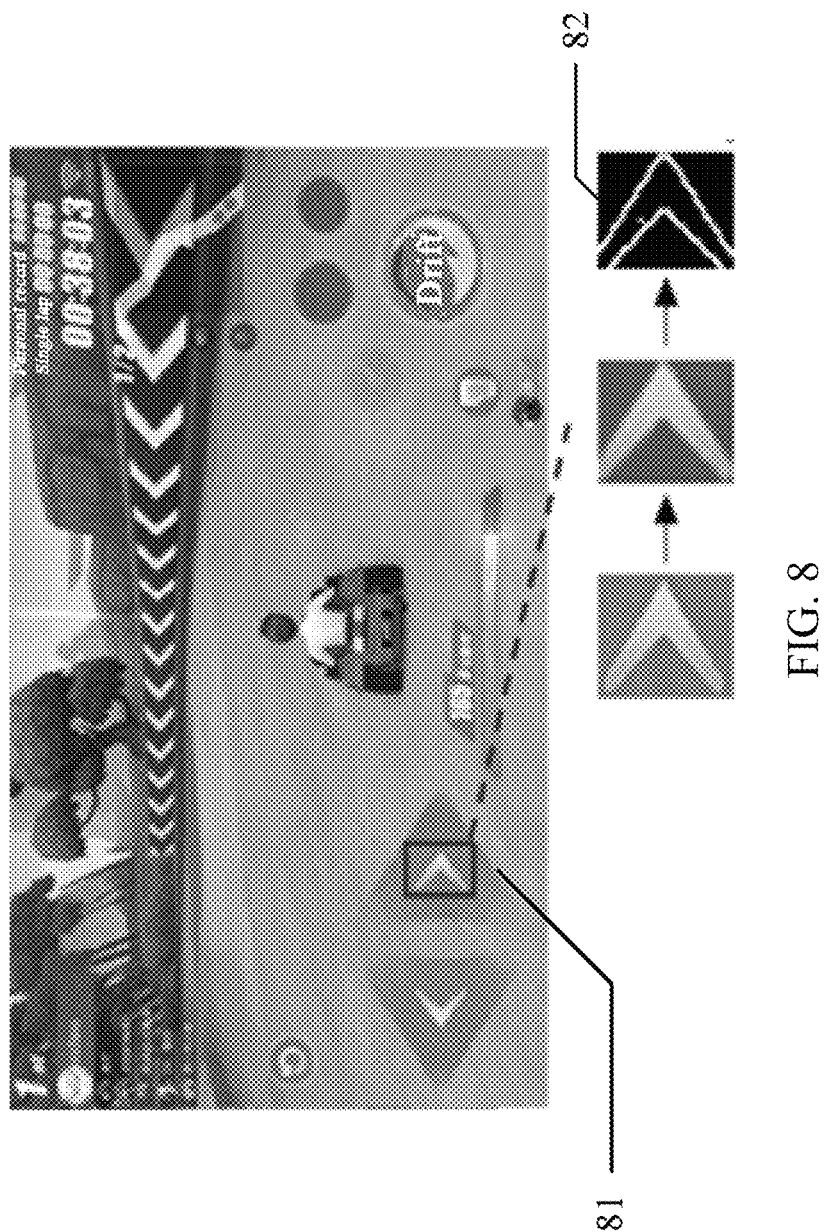
FIG. 8 is a schematic diagram of an implementation process of performing edge feature extraction on an operation control.

For example, as shown in FIG. 8, the control device performs edge feature extraction on a right-turning control 81 in the sample vehicle traveling picture to filter the interference caused by the background image and obtain a control image 82 of the right-turning control 81, thereby performing the template matching by using the control image 82.

In other possible implementations, if there is no difference between the operation control before being triggered and the operation control after being triggered, before recording a sample vehicle running video, a terminal may enable a contact display function, so that a contact mark is displayed in a sample vehicle traveling picture of the sample vehicle running video, and the triggered sample operation control is determined according to a display position of the contact mark.

Step 504B. Determine a sample traveling policy according to a sample traveling manner corresponding to the sample operation control.

After determining the sample operation control, the control device further determines a corresponding sample traveling policy according to a sample traveling manner indicated by the sample operation control.

Optionally, the sample traveling policy is represented by using a one-hot coded character string, a length of the one-hot coded character string is n, each character in the one-hot coded character string corresponds to a traveling manner, and n is an integer greater than or equal to 2. For example, the one-hot coded character string is a binary character string with a length of 6, and in the binary character string, traveling manners corresponding to the binary characters are [turning left, turning right, drifting towards left, drifting towards right, deceleration, going straight (no operation)].

When the sample traveling policy uses the foregoing representation form, this step includes the following steps.

Step 1. Determine a sample traveling manner corresponding to the sample operation control.

Optionally, the control device pre-stores a correspondence between sample operation controls and sample traveling manners. When a target operation control is a left-turning control, a target traveling manner is turning left; when a target operation control is a right-turning control, a target traveling manner is turning right; when a target operation control is a left-turning control and a drift control, a target traveling manner is drifting towards left; when a target operation control is a right-turning control and a drift control, a target traveling manner is drifting towards right; and when a target operation control is a braking control, a target traveling manner is deceleration.

Step 2. Set a value of a character corresponding to the sample traveling manner in the one-hot coded character string to be a maximum value.

After determining the sample traveling manner, the control device sets the value of the character corresponding to the sample traveling manner in the one-hot coded character string to be the maximum value, and sets values of remaining characters to be minimum values.

For example, when the one-hot coded character string is the binary character string with the length of 6, and the sample traveling manner is drifting towards left, the control device sets the character corresponding to left drift to 1, and the remaining characters to 0, so that the obtained one-hot coded character string is [0, 0, 1, 0, 0, 0].

Certainly, the sample traveling policy may be further represented by using other forms. This is not limited in this embodiment of this application.

Through the foregoing steps, the control device extracts a group of training samples. For video frames in a sample vehicle running video, the control device repeatedly performs the foregoing steps, so as to extract a plurality of groups of training samples.

Step 505. Calculate a proportion of each sample traveling policy according to the sample traveling policy in each group of training samples and a total quantity of training samples.

Quality of a traveling decision-making model is in a positive correlation with a quantity of training samples, that is, a smaller quantity of training samples indicates poorer model quality. Therefore, the quantity of the training samples needs to reach a sample threshold. Further, to reduce subsequent tuning on an output result of a model, the control device further needs to adjust the quantity of training samples corresponding to different traveling policies.

Optionally, when the obtained training samples reach the sample threshold (for example, 90000), the control device calculates a proportion of training samples corresponding to each sample traveling policy.

For example, when training samples are classified according to the sample traveling policies to obtain left-turning training samples, right-turning training samples, left-drift training samples, right-drift training samples, deceleration training samples, and go-straight training samples, and proportions of various training samples are 13%, 12%, 11%, 9%, 8%, and 47%.

Step 506. Perform sample sampling or sample copying on various training samples according to the proportion of each sample traveling policy, the sample sampling being used for reducing a quantity of training samples, and the sample copying being used for increasing a quantity of training samples.

In a possible implementation, the control device stores a target proportion of each type of training sample. The target proportions corresponding to different training samples may be the same or may be different, and in different tracks, the target proportion of each type of training sample may be different. For example, in a track, a target proportion corresponding to each type of training sample is shown in table 2.

TABLE 2

| Training sample | Target proportion |
|---|---|
| Left-turning training sample | 12% |
| Right-turning training sample | 12% |
| Left-drift training sample | 11% |
| Right-drift training sample | 10% |
| Deceleration training sample | 5% |
| Go-straight training sample | 50% |

Target proportions of different training samples are related to factors such as the quantity of bends, angles of bends, lengths of bends, lengths of straights, and the quantity of straights in the track.

Optionally, when a proportion of training samples is less than the target proportion, the control device increases the quantity of the training samples through sample copying. When a proportion of training samples is higher than the target proportion, the control device reduces the quantity of the training samples through sample sampling.

With reference to the example in step 505, because the proportion of the left-turning training samples is higher than the target proportion, the control device reduces the quantity of the left-turning training samples through random sampling. Because the proportion of the deceleration training samples is lower than the target proportion, the control device increases the quantity of the deceleration training samples through random copying.

Step 507. Train a traveling decision-making model according to the sample track image and the sample traveling policy.

An implementation of this step is similar to that of step 303, and details are not described again in this embodiment.

In this embodiment, the control device extracts an image in a map display area as a sample track image, to prevent other picture elements in a sample vehicle traveling picture from interfering with subsequent model training, extracts a track image and a vehicle image through feature extraction when the image in the map display area is translucently displayed, and combines the track image and the vehicle image to generate a sample track image, to further avoid interference caused by a background image, thereby improving accuracy of a model obtained through training.

In this embodiment, the control device determines a triggered operation control in the sample vehicle traveling picture based on a trigger size of the operation control in a triggered state, and determines a sample traveling policy according to a traveling manner corresponding to the operation control, thereby improving accuracy of the determined sample traveling policy.

In addition, in this embodiment, the control device further performs sample sampling or sample copying on various training samples according to proportions of various training samples to a total quantity of samples, to avoid a problem that some training samples are excessive and some training samples are insufficient, thereby reducing the difficulty of subsequently tuning a model output result.

Figure 9:
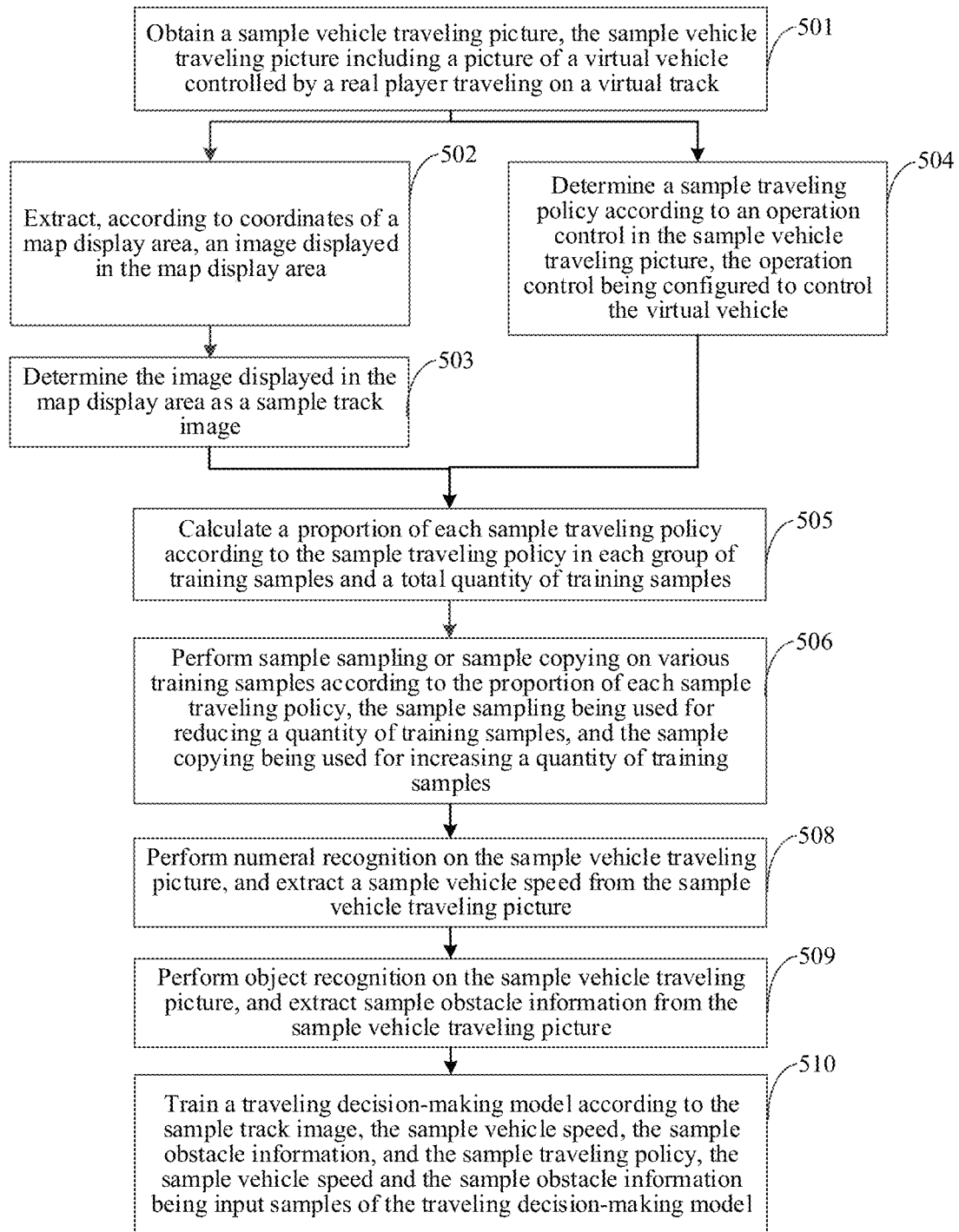
FIG. 9 is a flowchart of a model training method according to yet another embodiment of this application.

The traveling manner used by the virtual vehicle on the track is not only related to a virtual track segment in which the virtual vehicle is currently located, but also is related to a current speed of the virtual vehicle and an obstacle on the virtual track, and such information cannot be extracted from the sample track image. For example, on the same virtual track segment, when a vehicle speed is excessively high, the virtual vehicle needs to drift over a bend. When a vehicle speed is relatively low, the virtual vehicle passes through a bend normally (non-drift). To further improve accuracy of the traveling decision-making model, and simulate a more realistic effect of player control, based on FIG. 5, as shown in FIG. 9, after step 506, the method further includes the following steps.

Step 508. Perform numeral recognition on the sample vehicle traveling picture, and extract a sample vehicle speed from the sample vehicle traveling picture.

In a possible implementation, the control device prestores coordinates of a speed display area in the sample vehicle traveling picture, and performs numeral recognition on content in the speed display area according to the coordinates, so as to extract the sample vehicle speed.

The control device may perform numeral recognition by using a mature numeral recognition algorithm, and a specific algorithm is not limited in this embodiment of this application.

For example, as shown in FIG. 4, the control device performs numeral recognition on a picture in a speed display area 416, to obtain that a current sample vehicle speed of a virtual vehicle is 165 km/h.

Step 509. Perform object recognition on the sample vehicle traveling picture, and extract sample obstacle information from the sample vehicle traveling picture.

In a possible implementation, the control device performs object recognition on the sample vehicle traveling picture by using an image recognition technology, so as to extract the sample obstacle information. The sample obstacle information may include an obstacle type, an obstacle size, an obstacle distance, and the like.

The control device may perform object recognition by using a mature image recognition algorithm, and a specific algorithm is not limited in this embodiment of this application.

The control device may only extract the sample vehicle speed or only extract the sample obstacle information. This is not limited in this application.

Correspondingly, the control device performs model training by using the sample vehicle speed and the sample obstacle information, and step 507 may be replaced with the following step.

Step 510. Train a traveling decision-making model according to the sample track image, the sample vehicle speed, the sample obstacle information, and the sample traveling policy, the sample vehicle speed and the sample obstacle information being input samples of the traveling decision-making model.

During model training, the control device uses the sample track image, the sample vehicle speed, and the sample obstacle information as input samples, the sample traveling policy as an output sample, and uses a supervised machine learning algorithm to train the model. For a specific manner of training the traveling decision-making model according to the training samples, reference may be made to a mature CNN-related algorithm. Details are not described again in this embodiment of this application.

In this embodiment, the control device extracts a sample vehicle speed and sample obstacle information from a sample vehicle traveling picture by using an image recognition technology, and performs model training by using the sample vehicle speed and the sample obstacle information, thereby improving accuracy of the trained model.

The following uses a schematic embodiment to describe a model use process.

Figure 10:
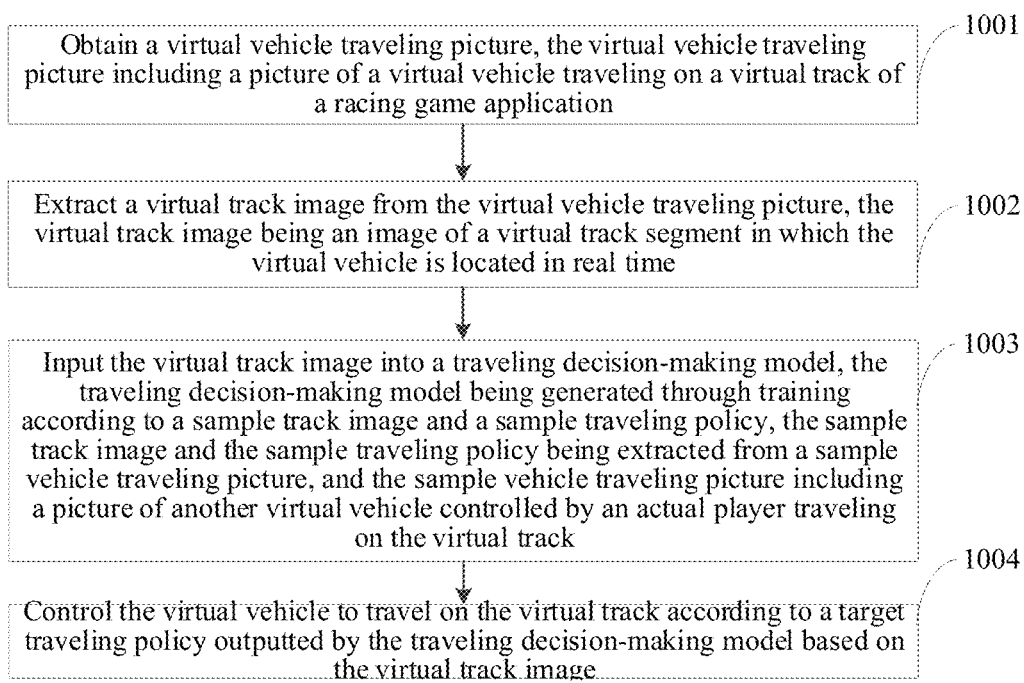
FIG. 10 is a flowchart of a virtual vehicle control method according to an embodiment of this application.

FIG. 10 is a flowchart of a virtual vehicle control method according to another embodiment of this application. The method is used in the control device 120 in the implementation environment shown in FIG. 1. The method includes the following steps. Certainly, the method may alternatively be performed by the terminal 110 in the environment shown in FIG. 1 alone. This is not limited in this embodiment of this application.

Step 1001. Obtain a virtual vehicle traveling picture, the virtual vehicle traveling picture including a picture of a virtual vehicle traveling on a virtual track.

Different from the model training stage in which the control device obtains the sample vehicle traveling picture from the sample vehicle running video, in the model use stage, the control device obtains a virtual vehicle traveling picture from a terminal (installed with a vehicle running application) in real time. Optionally, the terminal actively sends the virtual vehicle traveling picture to the control device in real time.

Content displayed in the virtual vehicle traveling picture is similar to the content displayed in the sample vehicle traveling picture, and a difference lies in that a virtual vehicle displayed in the sample vehicle traveling picture is controlled by an actual player, and a virtual vehicle displayed in the virtual vehicle traveling picture is controlled by the control device. Details are not described again in this embodiment.

Figure 11:
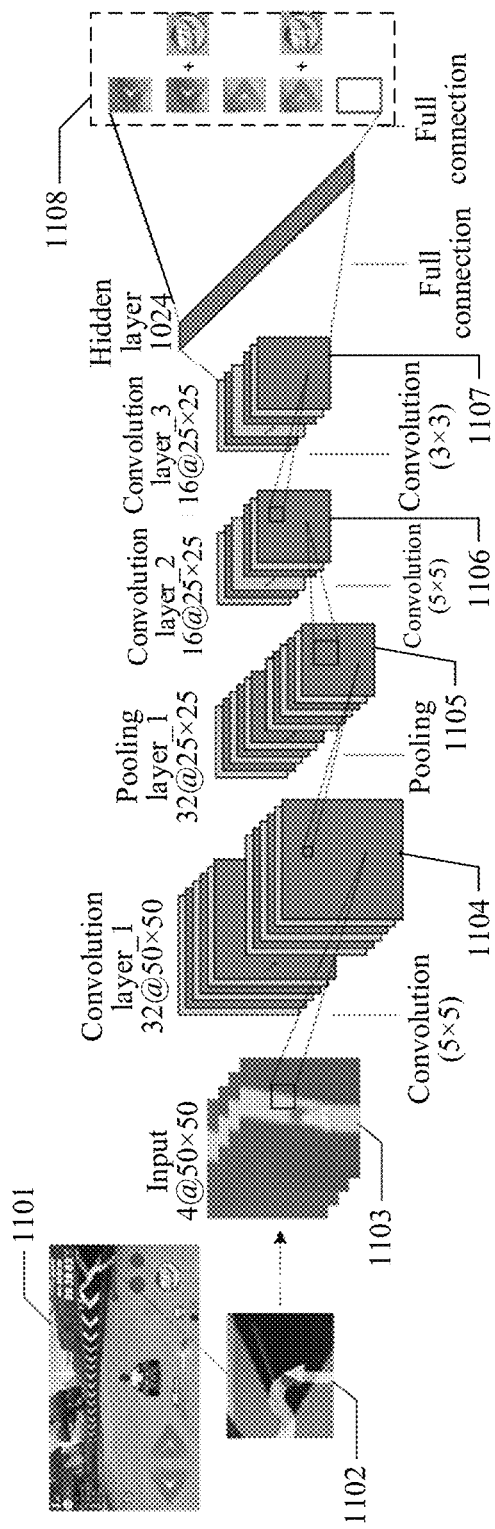
FIG. 11 is a schematic diagram of an implementation process of obtaining a target traveling policy according to a virtual vehicle traveling picture.

For example, as shown in FIG. 11, the control device obtains a virtual vehicle traveling picture 1101.

Step 1002. Extract a virtual track image from the virtual vehicle traveling picture, the virtual track image being an image of a virtual track segment in which the virtual vehicle is located in real time.

Similar to the model training stage in which the control device extracts the sample track image from the sample vehicle traveling picture, in the model use stage, the control device extracts a virtual track image from the virtual vehicle traveling picture by using an image recognition technology. For the process of extracting the virtual track image, reference may be made to the foregoing step 302, and details are not described again in this embodiment.

For example, as shown in FIG. 11, the control device extracts a virtual track image 1102 from the virtual vehicle traveling picture 1101.

Step 1003. Input the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture including a picture of another virtual vehicle controlled by an actual player traveling on the virtual track.

The control device uses the extracted virtual track image as a model input and inputs the virtual track image into the traveling decision-making model, and the traveling decision-making model outputs a corresponding target traveling policy according to the virtual track image. Before being inputted into the decision-making model, the virtual track image is subject to gray processing and size scaling processing.

In a possible implementation, a traveling decision-making model is based on a CNN model. The traveling decision-making model performs a series of convolution, pooling, and full connection processing on the inputted virtual track image, and finally outputs the target traveling policy.

For example, as shown in FIG. 11, the control device scales the virtual track image 1102 to be a 50*50 gray image 1103, and uses four continuous gray images 1103 as an input. In a convolution layer_1 (used for performing local feature extraction), convolution processing is performed on each gray image 1103 by using 32 5*5 convolution kernels, to obtain 32 50*50 feature images 1104, and the 32 50*50 feature images 1104 are inputted into a pooling layer_1. In the pooling layer_1, after being subject to pooling processing (for example, maximum pooling processing for narrowing the size of the feature image), each feature image 1104 is converted into a 25*25 feature image 1105 and is inputted into a convolution layer_2. In the convolution layer_2, convolution processing is performed on each feature image 1105 by using 16 convolution kernels, to obtain 16 25*25 feature images 1106, and the 16 25*25 feature images 1106 are inputted into a convolution layer_3. In the convolution layer_3, convolution processing is performed on each feature image 1106 by using 16 convolution kernels, to obtain 16 25*25 feature images 1107, and the 16 25*25 feature images 1107 are inputted into a hidden layer_1 (or referred to as a fully connected layer). In the hidden layer_1, full connection processing is performed on the 16 feature images 1107, and a corresponding target traveling policy 1108 (a triggered operation control) is finally outputted.

FIG. 11 is merely an example, and does not constitute a limitation to this application.

Step 1004. Control the virtual vehicle to travel on the virtual track of the racing game application according to a target traveling policy outputted by the traveling decision-making model based on the virtual track image.

Optionally, the control device determines, according to a traveling manner indicated by the target traveling policy, a target operation control corresponding to the traveling manner, and sends a control instruction for triggering the target operation control to the terminal. After receiving the control instruction, the terminal simulates an operation of a player triggering the target operation control, so as to control the virtual vehicle to travel.

For example, as shown in FIG. 11, when the target traveling policy outputted by the traveling decision-making model is turning left, the control device determines that the target operation control corresponding to left-turning is a left-turning control, and then sends a control instruction for triggering the left-turning control, and the terminal controls, according to the control instruction, the virtual vehicle to turn left.

In conclusion, in this embodiment of this application, a sample track image and a sample traveling policy are extracted from a sample vehicle traveling picture when an actual player controls a virtual vehicle to travel on a virtual track, and a traveling decision-making model is trained by using the sample track image and the sample traveling policy as training samples, so that a corresponding target traveling policy can be obtained subsequently by extracting a virtual track image from a virtual vehicle traveling picture and inputting the virtual track image into the traveling decision-making model, thereby controlling, according to the target traveling policy, the virtual vehicle to travel on the track. Because the traveling decision-making model is obtained through training based on a behavior of the actual player controlling the vehicle, a traveling policy outputted by the traveling decision-making model better conforms to an operating habit of the actual player, thereby achieving a more real simulation effect. In addition, when the traveling decision-making model is trained, the used training samples are all extracted from the virtual track image, so that a developer does not manually set the training sample, thereby reducing a development time and development costs.

In addition, in the process of using the traveling decision-making model based on the foregoing method, the control device directly extracts a virtual track image from a virtual vehicle traveling picture based on a computer vision (image recognition) technology, and because there is no need to obtain internal data of a virtual vehicle running application, code of the virtual vehicle running application is not invaded and running of the virtual vehicle running application is not affected, thereby improving running stability of the virtual vehicle running application.

Similar to the extraction of the sample track image during model training, when the virtual vehicle traveling picture is complex and includes a map display area, the control device extracts an image displayed in the map display area as the virtual track image. A schematic embodiment is provided below for description.

Figure 12:
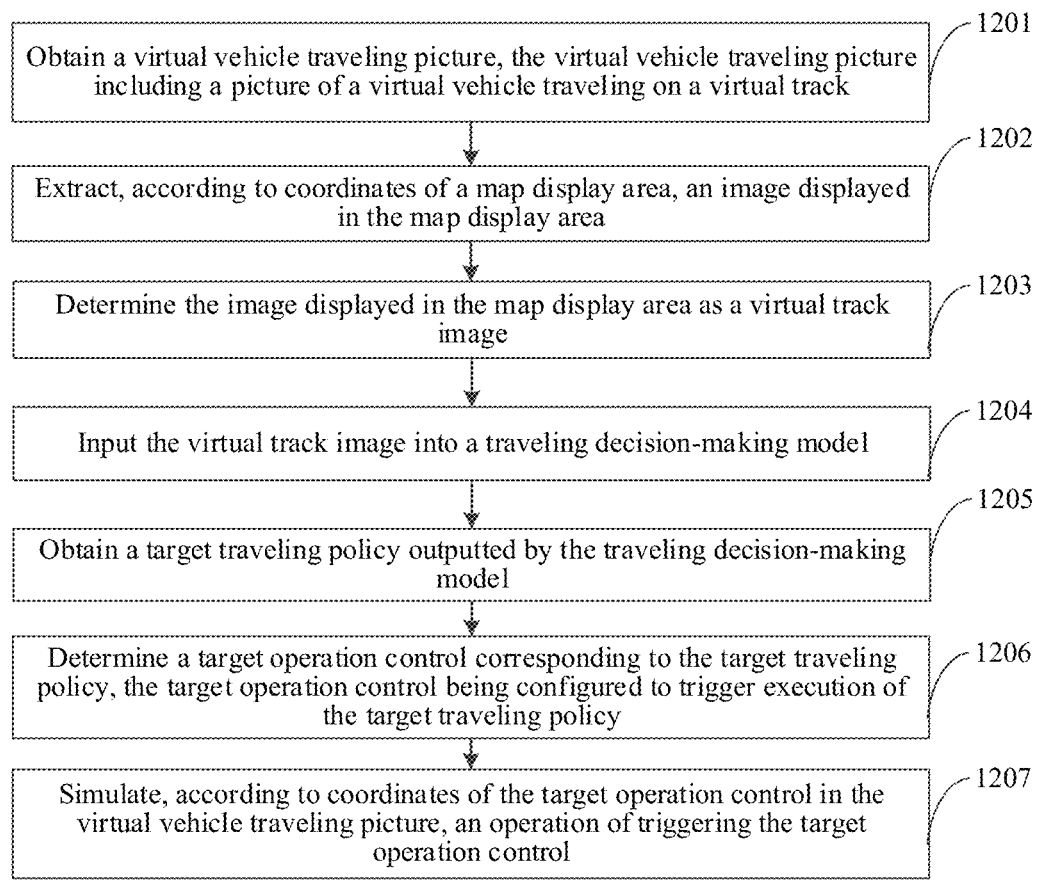
FIG. 12 is a flowchart of a virtual vehicle control method according to another embodiment of this application.

FIG. 12 is a flowchart of a virtual vehicle control method according to another embodiment of this application. The method is used in the control device 120 in the implementation environment shown in FIG. 1. The method includes the following steps.

Step 1201. Obtain a virtual vehicle traveling picture, the virtual vehicle traveling picture including a picture of a virtual vehicle traveling on a virtual track.

An implementation of this step is similar to that of step 1001, and details are not described again in this embodiment.

Step 1202. Extract, according to coordinates of a map display area, an image displayed in the map display area.

Similar to the model training stage in which the control device extracts the sample track image, in the model use stage, the control device extracts, according to coordinates of a pre-stored map display area, an image displayed in the map display area in the virtual vehicle traveling picture. For the implementation of extracting the image, reference may be made to step 502, and details are not described again in this embodiment.

Step 1203. Determine the image displayed in the map display area as a virtual track image.

In a possible implementation, when the image displayed in the map display area is non-transparent (transparency is 0), that is, a background cannot be viewed through the map display area, the control device performs gray processing and size scaling processing on the image displayed in the map display area, to obtain the virtual track image.

In another possible implementation, as the map display area occupies a partial area of a vehicle traveling picture, to help a user view the background through the map display area, the picture in the map display area is transparent (that is, translucent). If gray processing and size scaling processing are directly performed on the image displayed in the map display area, a background image causes interference and affects subsequent model training.

To reduce interference caused by the background image, in a possible implementation, the control device determines the virtual track image by using the following steps.

Step 1. Perform feature extraction on the image displayed in the map display area, to obtain a track image and a vehicle image, a feature extraction manner including edge feature extraction and/or color feature extraction.

Because the track image, the vehicle image, and the background image have respective features, the control device may perform feature extraction on the image displayed in the map display area, so as to extract a sample track image and a sample vehicle image.

Optionally, the control device may obtain the track image and the vehicle image through the edge feature extraction and/or the color feature extraction. A Canny edge detection algorithm or a Sobel edge detection algorithm may be used when the edge feature extraction is performed. This is not limited in this embodiment.

Step 2. Synthesize the virtual track image according to the track image and the vehicle image that are extracted.

After extracting the track image and the vehicle image, the control device synthesizes the track image and the vehicle image to generate the virtual track image, and the size of the virtual track image is the same as that of the image displayed in the map display area.

Step 3. Scale the virtual track image to a pre-determined size, the pre-determined size being an input image size specified by a traveling decision-making model.

To avoid interference of an image size, when the size of the virtual track image does not match the pre-determined size, the control device performs scaling on the virtual track image according to the pre-determined size. For example, the pre-determined size is 50px*50px.

Before scaling the virtual track image, the control device further needs to perform gray processing on the virtual track image.

Step 1204. Input the virtual track image into a traveling decision-making model.

An implementation of this step is similar to that of step 1003, and details are not described again in this embodiment.

Step 1205. Obtain a target traveling policy outputted by the traveling decision-making model.

The target traveling policy is used for indicating a traveling manner required for the virtual vehicle, and the traveling manner includes: turning left, turning right, drifting towards left, drifting towards right, deceleration, and going straight.

In other possible implementations, the traveling manner may further include jumping, resetting, and the like, and a specific traveling manner is not limited in this embodiment of this application.

Step 1206. Determine a target operation control corresponding to the target traveling policy, the target operation control being configured to trigger execution of the target traveling policy.

Optionally, the target traveling policy is represented by using a one-hot coded character string, a length of the one-hot coded character string is n, and each character in the one-hot coded character string corresponds to a traveling manner, n being an integer greater than or equal to 2. For example, the one-hot coded character string is a binary character string with a length of 6, and in the binary character string, traveling manners corresponding to the binary characters are [turning left, turning right, drifting towards left, drifting towards right, acceleration, going straight (no operation)].

When the target traveling policy uses the foregoing representation form, the determining a target operation control by the control device may include the following steps.

Step 1. Determine a target traveling manner corresponding to a maximum character in the one-hot coded character string.

Optionally, when the one-hot coded character string is a binary character string with a length of 6, the control device determines a traveling manner corresponding to a character position of a character "1" in the binary character string as a target traveling manner.

For example, with reference to the example in step 1206, when the obtained one-hot coded character string is [0, 0, 1, 0, 0, 0], the control device determines left drift as a target traveling manner.

Step 2. Determine an operation control corresponding to the target traveling manner as the target operation control.

Optionally, the control device pre-stores a correspondence between operation controls and traveling manners, and the control device determines the target operation control based on the correspondence.

The target operation control is a left-turning control in a case that the target traveling manner is turning left, the target operation control is a right-turning control in a case that the target traveling manner is turning right, the target operation control is a left-turning control and a drift control in a case that the target traveling manner is drifting towards left, the target operation control is a right-turning control and a drift control in a case that the target traveling manner is drifting towards right, and the target operation control is a braking control in a case that the target traveling manner is deceleration.

Step 1207. Simulate, according to coordinates of the target operation control in the virtual vehicle traveling picture, an operation of triggering the target operation control.

After determining the target operation control, the control device generates a corresponding control instruction according to the coordinates of the target operation control in the virtual vehicle traveling picture, and sends the control instruction to the terminal, so that the terminal simulates, according to the control instruction, an operation of triggering the target operation control.

When an actual player triggers an operation control, there may be a long press operation, that is, the operation control needs to be kept in a triggered state. Therefore, to simulate an operation behavior of a player more real and avoid simulating the long press operation as a continuous click operation, during simulation of the operation of triggering the target operation control, if the target operation control is changed from a first operation control to a second operation control, simulation of an operation of long pressing the first operation control is stopped and an operation of long pressing the second operation control is simulated; if the target operation control does not change, an operation of long pressing the target operation control is simulated. A duration of the long press operation may be a preset duration, for example, the preset duration is 20 ms.

In this embodiment, the control device extracts an image in a map display area as a virtual track image, so as to prevent other picture elements in a virtual vehicle traveling picture from interfering with model use; in addition, a track image and a vehicle image are extracted through feature extraction when the image in the map display area is translucently displayed, and the track image and the vehicle image are combined to generate the virtual track image, to further avoid interference caused by a background image, thereby improving accuracy of a model output.

Figure 13:
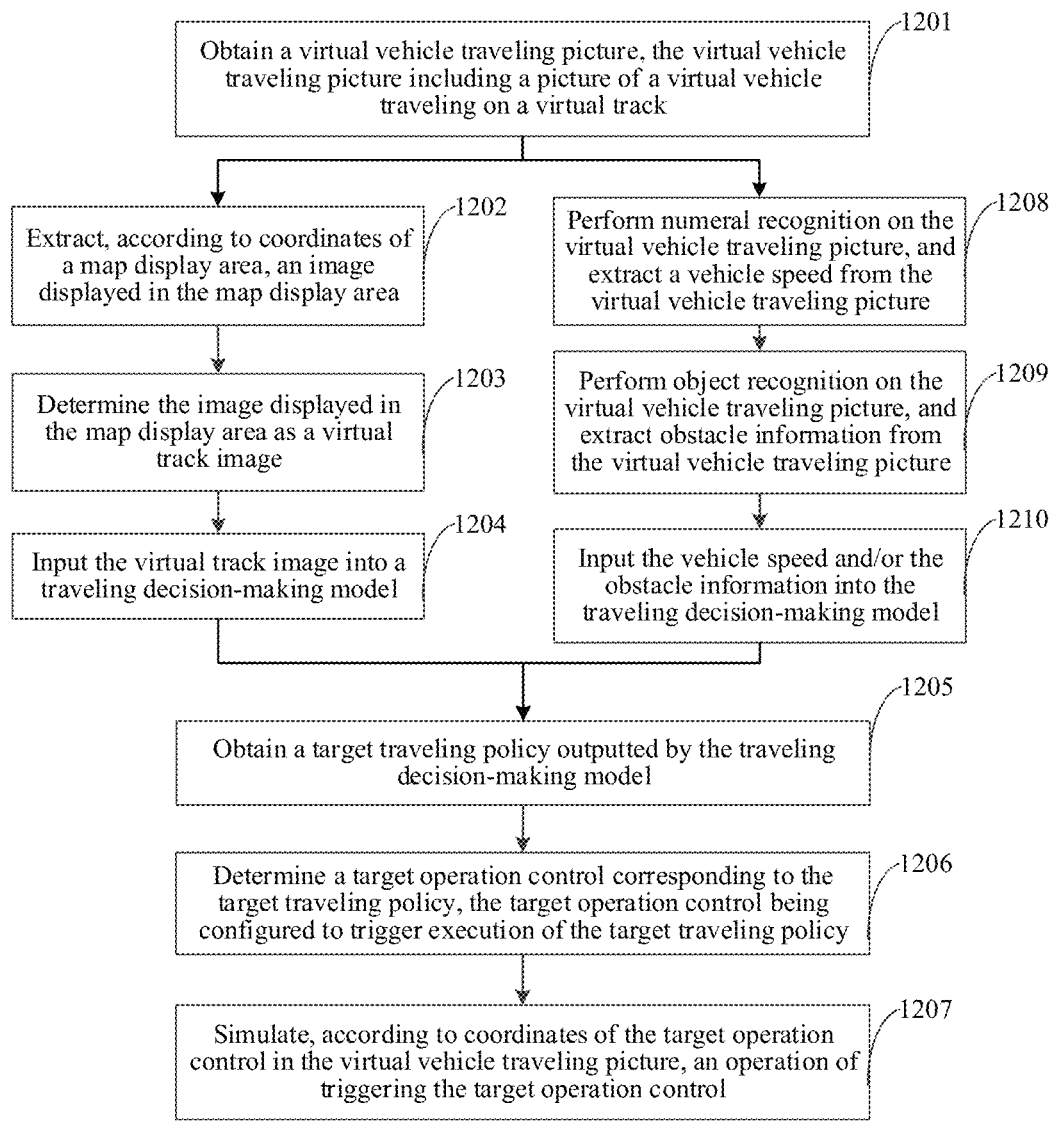
FIG. 13 is a flowchart of a virtual vehicle control method according to still another embodiment of this application.

The traveling manner used by the virtual vehicle on the virtual track is not only related to a virtual track segment in which the virtual vehicle is currently located, but also is related to a current speed of the virtual vehicle and an obstacle on the virtual track, and such information cannot be extracted from the virtual track image. For example, on the same virtual track segment, when a vehicle speed is excessively high, the virtual vehicle needs to drift over a bend. When the vehicle speed is relatively low, the virtual vehicle passes through a bend normally (non-drift). To simulate a more realistic effect of player control, based on FIG. 12, as shown in FIG. 13, after step 1201, the method further includes the following steps.

Step 1208. Perform numeral recognition on the virtual vehicle traveling picture, and extract a vehicle speed from the virtual vehicle traveling picture.

In a possible implementation, the control device pre-stores coordinates of a speed display area in a vehicle running picture, and performs numeral recognition on content in the speed display area according to the coordinates, so as to extract the vehicle speed.

The control device may perform numeral recognition by using a mature numeral recognition algorithm, and a specific algorithm is not limited in this embodiment of this application.

Step 1209. Perform object recognition on the virtual vehicle traveling picture, and extract obstacle information from the virtual vehicle traveling picture.

In a possible implementation, the control device performs object recognition on the virtual vehicle traveling picture by using an image recognition technology, so as to extract the obstacle information. The obstacle information may include an obstacle type, an obstacle size, an obstacle distance, and the like.

The control device may perform object recognition by using a mature image recognition algorithm, and a specific algorithm is not limited in this embodiment of this application.

The control device may only extract the vehicle speed or only extract the obstacle information. This is not limited in this application.

Step 1210. Input the vehicle speed and/or the obstacle information into the traveling decision-making model.

In a possible implementation, as shown in FIG. 11, the vehicle speed and/or the obstacle information may be added in the fully connected layer, so that the traveling decision-making model determines the target traveling policy based on the vehicle speed and/or the obstacle information.

In this embodiment, the control device extracts a real-time vehicle speed and obstacle information of the virtual vehicle from the virtual vehicle traveling picture by using an image recognition technology, and inputs the vehicle speed and the obstacle information into the traveling decision-making model for training, so that the outputted target traveling policy better conforms to decision-making of a real user, thereby improving reality of simulation and control.

Apparatus embodiments of this application are described below, and may be configured to perform the method embodiments of this application. For details not disclosed in the apparatus embodiments of this application, refer to the method embodiments of this application.

Figure 14:
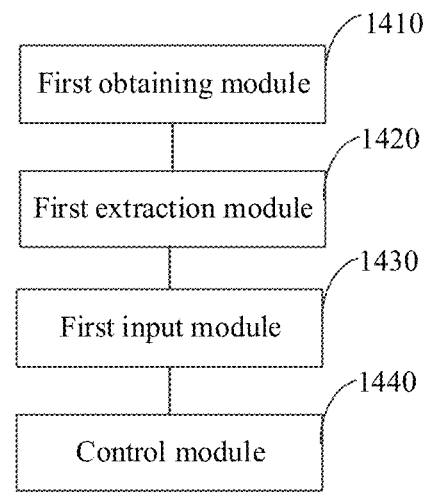
FIG. 14 is a block diagram of a virtual vehicle control apparatus according to an embodiment of this application.

FIG. 14 is a block diagram of a virtual vehicle control apparatus according to an embodiment of this application. The apparatus may be implemented by hardware, or may be implemented by hardware executing corresponding software. The apparatus may include:

a first obtaining module 1410, configured to obtain a virtual vehicle traveling picture, the virtual vehicle traveling picture including a picture of a virtual vehicle traveling on a virtual track;

a first extraction module 1420, configured to extract a virtual track image from the virtual vehicle traveling picture, the virtual track image being an image of a virtual track segment in which the virtual vehicle is located;

a first input module 1430, configured to input the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture including a picture of a virtual vehicle controlled by an actual player traveling on a virtual track; and a control module 1440, configured to control, according to a target traveling policy outputted by the traveling decision-making model, the virtual vehicle to travel.

Optionally, the virtual vehicle traveling picture includes a map display area, the map display area being used for displaying an image of a virtual track segment in which the virtual vehicle is located in real time; and the first extraction module 1420 is configured to:

extract, according to coordinates of the map display area, an image displayed in the map display area; and determine the image displayed in the map display area as the virtual track image.

Optionally, the image displayed in the map display area is transparent, and the first extraction module 1420 is configured to:

perform feature extraction on the image displayed in the map display area, to obtain a track image and a vehicle image, a feature extraction manner including edge feature extraction and/or color feature extraction;

synthesize the virtual track image according to the track image and the vehicle image that are extracted; and scale the virtual track image to a pre-determined size, the pre-determined size being an input image size specified by the traveling decision-making model.

Optionally, the virtual vehicle traveling picture further includes an operation control, and the operation control is configured to control the virtual vehicle; and the control module 1440 is configured to:

determine a target operation control corresponding to the target traveling policy, the target operation control being configured to trigger execution of the target traveling policy; and simulate, according to coordinates of the target operation control in the virtual vehicle traveling picture, an operation of triggering the target operation control.

Optionally, the target traveling policy is represented by using a one-hot coded character string, a length of the one-hot coded character string is n, and each character in the one-hot coded character string corresponds to a traveling manner, n being an integer greater than or equal to 2; and the control module 1440 is configured to:

determine a target traveling manner corresponding to a maximum character in the one-hot coded character string; and determine the operation control corresponding to the target traveling manner as the target operation control, the target operation control being a left-turning control in a case that the target traveling manner is turning left, the target operation control being a right-turning control in a case that the target traveling manner is turning right, the target operation control being a left-turning control and a drift control in a case that the target traveling manner is drifting towards left, the target operation control being a right-turning control and a drift control in a case that the target traveling manner is drifting towards right, and the target operation control being a braking control in a case that the target traveling manner is deceleration.

Optionally, the control module 1440 is configured to:

stop simulating an operation of long pressing a first operation control, and simulate an operation of long pressing a second operation control, in a case that the target operation control is changed from the first operation control to the second operation control; and simulate, in a case that the target operation control does not change, an operation of long pressing the target operation control.

Optionally, the traveling decision-making model is generated through training further according to a sample vehicle speed and/or sample obstacle information, the sample vehicle speed and the sample obstacle information being extracted from the picture of the sample vehicle running video; and the apparatus further includes:

a speed extraction module, configured to perform numeral recognition on the virtual vehicle traveling picture, and extract a vehicle speed from the virtual vehicle traveling picture;

and/or an information extraction module, configured to perform object recognition on the virtual vehicle traveling picture, and extract obstacle information from the virtual vehicle traveling picture; and a second input module, configured to input the vehicle speed and/or the obstacle information into the traveling decision-making model.

Figure 15:
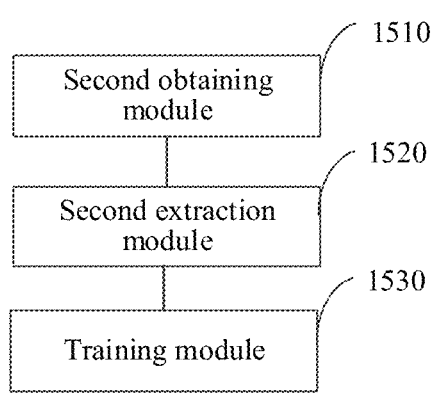
FIG. 15 is a block diagram of a model training apparatus according to an embodiment of this application.

FIG. 15 is a block diagram of a model training apparatus according to another embodiment of this application. The apparatus may be implemented by hardware, or may be implemented by hardware executing corresponding software. The apparatus may include:

a second obtaining module 1510, configured to obtain a sample vehicle traveling picture, the sample vehicle traveling picture including a picture of a virtual vehicle controlled by an actual player traveling on a virtual track;

a second extraction module 1520, configured to extract a sample track image and a sample traveling policy from the sample vehicle traveling picture, the sample traveling policy being used for indicating a traveling manner of the virtual vehicle on the virtual track; and a training module 1530, configured to train a traveling decision-making model according to the sample track image and the sample traveling policy, the sample track image being an input sample of the traveling decision-making model, the sample traveling policy being an output sample of the traveling decision-making model, the traveling decision-making model being used for outputting a target traveling policy according to an inputted virtual track image, the virtual track image being obtained through extraction from a virtual vehicle traveling picture, and the target traveling policy being used for controlling the virtual vehicle to travel.

Optionally, the sample vehicle traveling picture includes a map display area, the map display area being used for displaying an image of a virtual track segment in which the virtual vehicle is located in real time; and the second extraction module 1520 is configured to:

extract, according to coordinates of the map display area, an image displayed in the map display area;

determine the image displayed in the map display area as the sample track image; and determine the sample traveling policy according to an operation control in the sample vehicle traveling picture, the operation control being configured to control the virtual vehicle.

Optionally, the image displayed in the map display area is transparent, and the second extraction module 1520 is configured to:

perform feature extraction on the image displayed in the map display area, to obtain a sample track image and a sample vehicle image, a feature extraction manner including edge feature extraction and/or color feature extraction;

synthesize the sample track image according to the sample track image and the sample vehicle image that are extracted; and scale the sample track image to a pre-determined size, the pre-determined size being an input image size specified by the traveling decision-making model.

Optionally, the second extraction module 1520 is configured to:

recognize a triggered sample operation control in the sample vehicle traveling picture; and determine the sample traveling policy according to a sample traveling manner corresponding to the sample operation control.

Optionally, the second extraction module 1520 is configured to:

obtain a trigger size of each operation control, the trigger size being a size displayed when an operation control is triggered; and determine an operation control of which a size matches the trigger size in the sample vehicle traveling picture as the triggered sample operation control.

Optionally, the sample traveling policy is represented by using a one-hot coded character string, a length of the one-hot coded character string is n, and each character in the one-hot coded character string corresponds to a traveling manner, n being an integer greater than or equal to 2; and the second extraction module 1520 is configured to:

determine the sample traveling manner corresponding to the sample operation control; and set a value of a character corresponding to the sample traveling manner in the one-hot coded character string to be a maximum value, where the target traveling manner is turning left in a case that the target operation control is a left-turning control; the target traveling manner is turning right in a case that the target operation control is a right-turning control; the target traveling manner is drifting towards left in a case that the target operation control is a left-turning control and a drift control; the target traveling manner is drifting towards right in a case that the target operation control is a right-turning control and a drift control; and the target traveling manner is deceleration in a case that the target operation control is a braking control.

Optionally, the apparatus further includes:

a calculation module, configured to calculate a proportion of each sample traveling policy according to the sample traveling policy in each group of training samples and a total quantity of training samples; and a sampling and copying module, configured to perform sample sampling or sample copying on various training samples according to the proportion of each sample traveling policy, the sample sampling being used for reducing a quantity of training samples, and the sample copying being used for increasing a quantity of training samples.

Optionally, the apparatus further includes:

a numeral recognition module, configured to perform numeral recognition on the sample vehicle traveling picture, and extract a sample vehicle speed from the sample vehicle traveling picture; and an obstacle recognition module, configured to perform object recognition on the sample vehicle traveling picture, and extract sample obstacle information from the sample vehicle traveling picture.

The training module 1530 is further configured to:

train the traveling decision-making model according to the sample track image, the sample vehicle speed, the sample obstacle information, and the sample traveling policy, the sample vehicle speed and the sample obstacle information being input samples of the traveling decision-making model.

An embodiment of this application further provides a control device, including a memory and one or more processors, the memory storing computer-readable instructions, the computer-readable instructions, when being executed by the one or more processors, causing the one or more processors to perform the steps in the virtual vehicle control method or model training method according to the foregoing embodiments.

Figure 16:
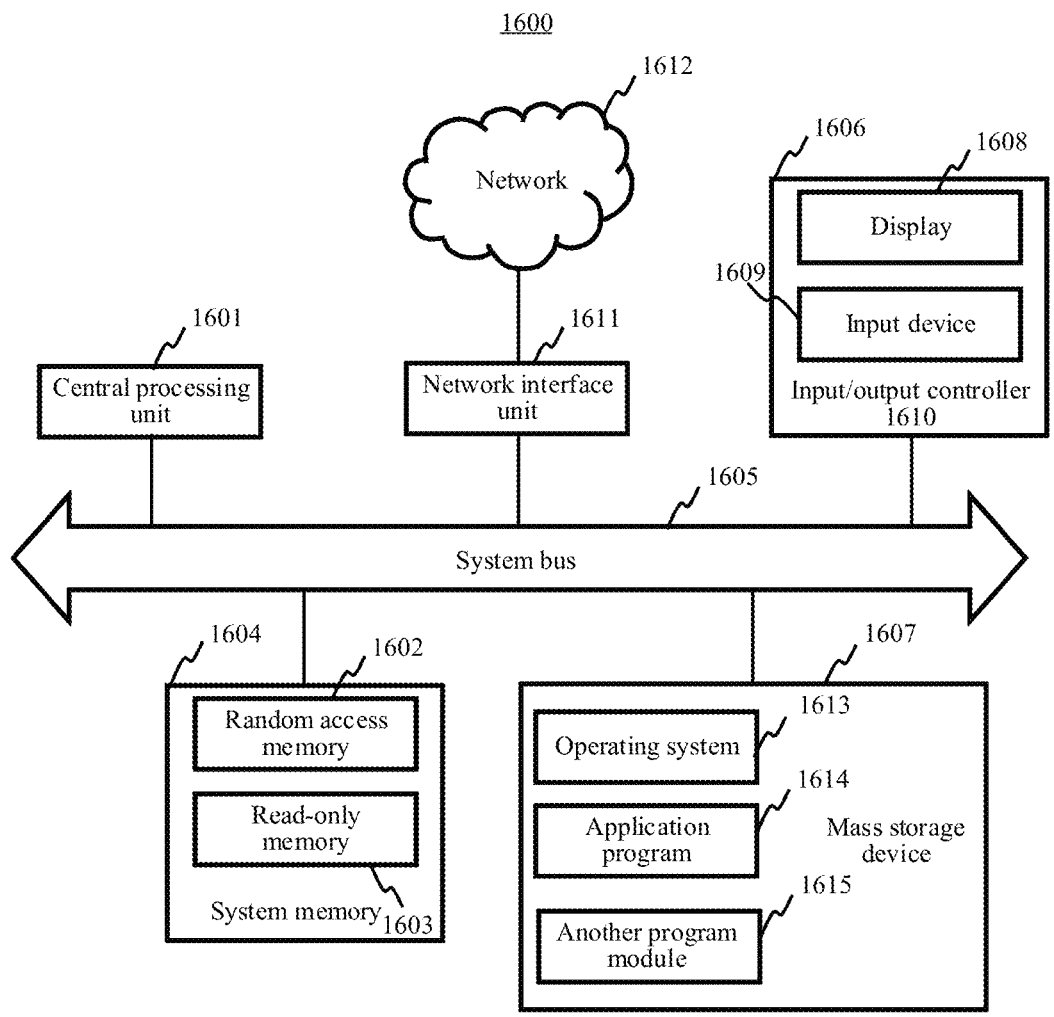
FIG. 16 is a schematic structural diagram of a control device according to an embodiment of this application

FIG. 16 is a schematic structural diagram of a control device according to an embodiment of this application. The control device is configured to implement the method provided in the foregoing embodiments. Specifically, The control device 1600 includes a central processing unit (CPU) 1601, a system memory 1604 including a random access memory (RAM) 1602 and a read-only memory (ROM) 1603, and a system bus 1605 connecting the system memory 1604 and the central processing unit 1601. The control device 1600 further includes a basic input/output system (I/O system) 1606 configured to transmit information between components in a computer, and a mass storage device 1607 configured to store an operating system 1613, an application program 1614, and another program module 1615.

The basic input/output system 1606 includes a display 1608 configured to display information and an input device 1609, such as a mouse or a keyboard, configured to allow a user to input information. The display 1608 and the input device 1609 are both connected to the central processing unit 1601 by using an input/output controller 1610 connected to the system bus 1605. The basic input/output system 1606 may further include the input/output controller 1610 configured to receive and process an input from a plurality of other devices such as a keyboard, a mouse, or an electronic stylus. Similarly, the input/output controller 1610 further provides an output to a display screen, a printer, or another type of output device.

The mass storage device 1607 is connected to the central processing unit 1601 by using a mass storage controller (not shown) connected to the system bus 1605. The mass storage device 1607 and an associated non-transitory computer-readable storage medium provide non-volatile storage for the control device 1600. That is, the mass storage device 1607 may include a computer-readable medium (not shown) such as a hard disk drive or a CD-ROM driver.

In general, the computer-readable medium may include a computer storage medium and a communications medium. The non-transitory computer-readable storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1604 and the mass storage device 1607 may be collectively referred to as a memory.

According to the embodiments of this application, the control device 1600 may further be connected, through a network such as the Internet, to a remote computer on the network. That is, the control device 1600 may be connected to a network 1612 by using a network interface unit 1611 connected to the system bus 1605, or may be connected to another type of network or a remote computer system by using a network interface unit 1611.

An embodiment of this application further provides a non-transitory computer-readable storage medium storing computer-readable instructions, the computer-readable instructions, when being executed by one or more processors, causing the one or more processors to perform the steps of the virtual vehicle control method or model training method according to the foregoing embodiments.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

What is claimed is:

1. A method for controlling a virtual vehicle in a racing game application, performed by a computing device having one or more processors and memory storing a plurality of computer-readable instructions to be executed by the one or more processors, the method comprising:
    obtaining a virtual vehicle traveling picture, the virtual vehicle traveling picture comprising a picture of a virtual vehicle traveling on a virtual track of the racing game application;
    extracting a virtual track image from the virtual vehicle traveling picture, the virtual track image being an image of a virtual track segment in which the virtual vehicle is located in real time;
    inputting the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture comprising a picture of another virtual vehicle controlled by an actual player traveling on the virtual track of the racing game application; and
    controlling the virtual vehicle to travel on the virtual track of the racing game application according to a target traveling policy outputted by the traveling decision-making model based on the virtual track image.

2. The method according to claim 1, wherein the virtual vehicle traveling picture comprises a map display area, the map display area being used for displaying an image of the virtual track segment in which the virtual vehicle is located in real time; and
    the extracting a virtual track image from the virtual vehicle traveling picture comprises:
    extracting, according to coordinates of the map display area, an image displayed in the map display area; and
    determining the image displayed in the map display area as the virtual track image.

3. The method according to claim 2, wherein the image displayed in the map display area is transparent, and the determining the image displayed in the map display area as the virtual track image comprises:
    performing feature extraction on the image displayed in the map display area, to obtain a track image and a vehicle image, the feature extraction comprising at least one of edge feature extraction and color feature extraction;
    synthesizing the virtual track image according to the track image and the vehicle image that are extracted; and
    scaling the virtual track image to a pre-determined size, the pre-determined size being an input image size specified by the traveling decision-making model.

4. The method according to claim 1, wherein the virtual vehicle traveling picture further comprises an operation control, the operation control being configured to control the virtual vehicle; and
    the controlling the virtual vehicle to travel on the virtual track of the racing game application according to a target traveling policy outputted by the traveling decision-making model based on the virtual track image comprises:
    determining a target operation control corresponding to the target traveling policy, the target operation control being configured to trigger execution of the target traveling policy on the virtual vehicle in the racing game application; and
    simulating, according to coordinates of the target operation control in the virtual vehicle traveling picture, an operation of triggering the target operation control on the virtual vehicle in the racing game application.

5. The method according to claim 4, wherein the target traveling policy is represented by using a one-hot coded character string, a length of the one-hot coded character string is n, n being an integer greater than or equal to 2, each character in the one-hot coded character string corresponds to a traveling manner; and
    the determining a target operation control corresponding to the target traveling policy comprises:
    determining a target traveling manner corresponding to a maximum character in the one-hot coded character string; and
    determining an operation control corresponding to the target traveling manner as the target operation control,
    the target operation control being a left-turning control in a case that the target traveling manner is turning left, the target operation control being a right-turning control in a case that the target traveling manner is turning right, the target operation control being a left-turning control and a drift control in a case that the target traveling manner is drifting towards left, the target operation control being a right-turning control and a drift control in a case that the target traveling manner is drifting towards right, and the target operation control being a braking control in a case that the target traveling manner is deceleration.

6. The method according to claim 4, wherein the simulating an operation of triggering the target operation control on the virtual vehicle in the racing game application comprises:
    stopping simulating an operation of long pressing a first operation control, and simulating an operation of long pressing a second operation control, in a case that the target operation control is changed from the first operation control to the second operation control; and
    simulating, in a case that the target operation control does not change, an operation of long pressing the target operation control on the virtual vehicle in the racing game application.

7. The method according to claim 1, wherein the traveling decision-making model is generated through training further according to a sample vehicle speed, the sample vehicle speed being extracted from a picture of a sample vehicle running video; and
    after the obtaining a virtual vehicle traveling picture, the method further comprises:
    performing numeral recognition on the virtual vehicle traveling picture, and extracting a vehicle speed from the virtual vehicle traveling picture; and after the inputting the virtual track image into a traveling decision-making model, the method further comprises:
inputting the vehicle speed into the traveling decision-making model.

8. The method according to claim 1, wherein the traveling decision-making model is generated through training further according to sample obstacle information, the sample obstacle information being extracted from the picture of the sample vehicle running video; and
after the obtaining a virtual vehicle traveling picture, the method further comprises:
performing object recognition on the virtual vehicle traveling picture, and extracting obstacle information from the virtual vehicle traveling picture; and
after the inputting the virtual track image into a traveling decision-making model, the method further comprises:
inputting the obstacle information into the traveling decision-making model.

9. A computing device, comprising a memory and one or more processors, the memory storing computer-readable instructions, the computer-readable instructions, when being executed by the one or more processors, causing the computing device to perform a plurality of operations including:
obtaining a virtual vehicle traveling picture, the virtual vehicle traveling picture comprising a picture of a virtual vehicle traveling on a virtual track of a racing game application;
extracting a virtual track image from the virtual vehicle traveling picture, the virtual track image being an image of a virtual track segment in which the virtual vehicle is located in real time;
inputting the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture comprising a picture of another virtual vehicle controlled by an actual player traveling on the virtual track of the racing game application; and
controlling the virtual vehicle to travel on the virtual track of the racing game application according to a target traveling policy outputted by the traveling decision-making model based on the virtual track image.

10. The computing device according to claim 9, wherein the virtual vehicle traveling picture comprises a map display area, the map display area being used for displaying an image of the virtual track segment in which the virtual vehicle is located in real time; and
the extracting a virtual track image from the virtual vehicle traveling picture comprises:
extracting, according to coordinates of the map display area, an image displayed in the map display area; and
determining the image displayed in the map display area as the virtual track image.

11. The computing device according to claim 10, wherein the image displayed in the map display area is transparent, and the determining the image displayed in the map display area as the virtual track image comprises:
performing feature extraction on the image displayed in the map display area, to obtain a track image and a vehicle image, the feature extraction comprising at least one of edge feature extraction and color feature extraction;
synthesizing the virtual track image according to the track image and the vehicle image that are extracted; and scaling the virtual track image to a pre-determined size, the pre-determined size being an input image size specified by the traveling decision-making model.

12. The computing device according to claim 9, wherein the virtual vehicle traveling picture further comprises an operation control, the operation control being configured to control the virtual vehicle; and
the controlling the virtual vehicle to travel on the virtual track of the racing game application according to a target traveling policy outputted by the traveling decision-making model based on the virtual track image comprises:
determining a target operation control corresponding to the target traveling policy, the target operation control being configured to trigger execution of the target traveling policy on the virtual vehicle in the racing game application; and
simulating, according to coordinates of the target operation control in the virtual vehicle traveling picture, an operation of triggering the target operation control on the virtual vehicle in the racing game application.

13. The computing device according to claim 12, wherein the target traveling policy is represented by using a one-hot coded character string, a length of the one-hot coded character string is n, n being an integer greater than or equal to 2, each character in the one-hot coded character string corresponds to a traveling manner; and
the determining a target operation control corresponding to the target traveling policy comprises:
determining a target traveling manner corresponding to a maximum character in the one-hot coded character string; and
determining an operation control corresponding to the target traveling manner as the target operation control,
the target operation control being a left-turning control in a case that the target traveling manner is turning left, the target operation control being a right-turning control in a case that the target traveling manner is turning right, the target operation control being a left-turning control and a drift control in a case that the target traveling manner is drifting towards left, the target operation control being a right-turning control and a drift control in a case that the target traveling manner is drifting towards right, and the target operation control being a braking control in a case that the target traveling manner is deceleration.

14. The computing device according to claim 12, wherein the simulating an operation of triggering the target operation control on the virtual vehicle in the racing game application comprises:
stopping simulating an operation of long pressing a first operation control, and simulating an operation of long pressing a second operation control, in a case that the target operation control is changed from the first operation control to the second operation control; and
simulating, in a case that the target operation control does not change, an operation of long pressing the target operation control on the virtual vehicle in the racing game application.

15. The computing device according to claim 9, wherein the traveling decision-making model is generated through training further according to a sample vehicle speed, the sample vehicle speed being extracted from a picture of a sample vehicle running video; and the plurality of operations further comprise:
after obtaining a virtual vehicle traveling picture, performing numeral recognition on the virtual vehicle traveling picture, and extracting a vehicle speed from the virtual vehicle traveling picture; and after inputting the virtual track image into a traveling decision-making model, inputting the vehicle speed into the traveling decision-making model.

16. The computing device according to claim 9, wherein the traveling decision-making model is generated through training further according to sample obstacle information, the sample obstacle information being extracted from the picture of the sample vehicle running video; and the plurality of operations further comprise:

after obtaining a virtual vehicle traveling picture, performing object recognition on the virtual vehicle traveling picture, and extracting obstacle information from the virtual vehicle traveling picture; and after inputting the virtual track image into a traveling decision-making model, inputting the obstacle information into the traveling decision-making model.

17. A non-transitory computer-readable storage medium storing a plurality of computer-readable instructions, the computer-readable instructions, when being executed by one or more processors of a computing device, causing the computing device to perform a plurality of operations including:

obtaining a virtual vehicle traveling picture, the virtual vehicle traveling picture comprising a picture of a virtual vehicle traveling on a virtual track of a racing game application;

extracting a virtual track image from the virtual vehicle traveling picture, the virtual track image being an image of a virtual track segment in which the virtual vehicle is located in real time;

inputting the virtual track image into a traveling decision-making model, the traveling decision-making model being generated through training according to a sample track image and a sample traveling policy, the sample track image and the sample traveling policy being extracted from a sample vehicle traveling picture, and the sample vehicle traveling picture comprising a picture of another virtual vehicle controlled by an actual player traveling on the virtual track of the racing game application; and controlling the virtual vehicle to travel on the virtual track of the racing game application according to a target traveling policy outputted by the traveling decision-making model based on the virtual track image.

18. The non-transitory computer-readable storage medium according to claim 17, wherein the virtual vehicle traveling picture comprises a map display area, the map display area being used for displaying an image of the virtual track segment in which the virtual vehicle is located in real time; and the extracting a virtual track image from the virtual vehicle traveling picture comprises:

extracting, according to coordinates of the map display area, an image displayed in the map display area; and determining the image displayed in the map display area as the virtual track image.

19. The non-transitory computer-readable storage medium according to claim 18, wherein the image displayed in the map display area is transparent, and the determining the image displayed in the map display area as the virtual track image comprises:

performing feature extraction on the image displayed in the map display area, to obtain a track image and a vehicle image, the feature extraction comprising at least one of edge feature extraction and color feature extraction;

synthesizing the virtual track image according to the track image and the vehicle image that are extracted; and scaling the virtual track image to a pre-determined size, the pre-determined size being an input image size specified by the traveling decision-making model.

20. The non-transitory computer-readable storage medium according to claim 17, wherein the virtual vehicle traveling picture further comprises an operation control, the operation control being configured to control the virtual vehicle; and the controlling the virtual vehicle to travel on the virtual track of the racing game application according to a target traveling policy outputted by the traveling decision-making model based on the virtual track image comprises:

determining a target operation control corresponding to the target traveling policy, the target operation control being configured to trigger execution of the target traveling policy on the virtual vehicle in the racing game application; and simulating, according to coordinates of the target operation control in the virtual vehicle traveling picture, an operation of triggering the target operation control on the virtual vehicle in the racing game application.

* * * * *